United States Patent
Ohashi

(10) Patent No.: US 7,852,498 B2
(45) Date of Patent: Dec. 14, 2010

(54) POST-PRINTING PROCESS SUPPORT SYSTEM, POST-PRINTING PROCESS SUPPORT PROGRAM, AND POST-PRINTING PROCESS SUPPORT METHOD

(75) Inventor: Hirotaka Ohashi, Suwa (JP)

(73) Assignee: Seiko Epson Corporation (JP)

( * ) Notice: Subject to any disclaimer, the term of this patent is extended or adjusted under 35 U.S.C. 154(b) by 1020 days.

(21) Appl. No.: 11/352,626

(22) Filed: Feb. 13, 2006

(65) Prior Publication Data

US 2006/0184877 A1    Aug. 17, 2006

(30) Foreign Application Priority Data

Feb. 14, 2005  (JP)  ............. 2005-035651
Oct. 25, 2005  (JP)  ............. 2005-309449

(51) Int. Cl.
  *G06F 3/12*  (2006.01)
  *G06K 15/00*  (2006.01)

(52) U.S. Cl. ................ 358/1.13; 358/1.1

(58) Field of Classification Search ........... 358/1.1–1.9, 358/1.11–1.18; 399/81, 14, 86
See application file for complete search history.

(56) References Cited

U.S. PATENT DOCUMENTS

| | | | |
|---|---|---|---|
| 5,188,470 A * | 2/1993 | Matsubara et al. | 400/621 |
| 6,278,524 B1 | 8/2001 | Kujirai et al. | |
| 6,285,842 B1 * | 9/2001 | Katamoto et al. | 399/81 |
| 6,556,310 B1 * | 4/2003 | Livingston | 358/1.18 |
| 6,661,530 B1 * | 12/2003 | Munetomo et al. | 358/1.15 |
| 2003/0007818 A1 * | 1/2003 | Kato | 400/61 |
| 2005/0180793 A1 * | 8/2005 | Nishiguchi | 400/76 |

FOREIGN PATENT DOCUMENTS

| | | |
|---|---|---|
| JP | 11-020272 | 1/1999 |
| JP | 11-149362 | 6/1999 |
| JP | 2003-125125 | 4/2003 |
| JP | 2003-189027 | 7/2003 |
| JP | 2003-248574 | 9/2003 |
| JP | 2001-80152 | 3/2007 |

OTHER PUBLICATIONS

Compuserve Incorporated, Jul. 31, 1990, Cover Sheet for the GIF89a Specification, Compuserve GIF Specification (GIF 89a).
CIP4 Organization, May 9, 2004, "JDF Specification Release 1,2", Chapter 7.2.68 FoldingParams (pp. 366-369); CIP4 Organization, May 9, 2004., JDG Specification, Release 1,2, Chapter 7.2.99 LayoutPreparationParams (pp. 408-416).

* cited by examiner

*Primary Examiner*—Gabriel I Garcia
(74) *Attorney, Agent, or Firm*—Harness, Dickey & Pierce, P.L.C.

(57) ABSTRACT

A post-printing process support system, which supports a post-printing process relating to a print medium, includes: a print setting information acquisition section which acquires print setting information including a setting relating to a print format; an animation data generation section which generates, based on the print setting information acquired by the print setting information acquisition section, animation data which shows a post-printing process procedure relating to the print medium which has been printed based on the print setting information; and an animation image display section which displays an animation image based on the animation data generated by the animation data generation section.

6 Claims, 15 Drawing Sheets

| | |
|---|---|
| 310 — OneSideFront | ONE-SIDED PRINTING ON FRONT SURFACE |
| 320 — TwoSideFlipX | TWO-SIDED PRINTING TO FLIP PAGES ALONG X-AXIS |
| 330 — TwoSideFlipY | TWO-SIDED PRINTING TO FLIP PAGES ALONG Y-AXIS |
FIG. 4
| FoldCatalog | FOLDING METHOD (SOLID LINE SHOWS MOUNTAIN FOLD) |
|---|---|
| F8-1 | 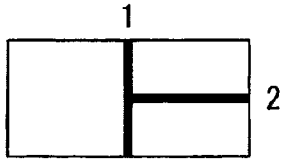 |
| F16-1 | 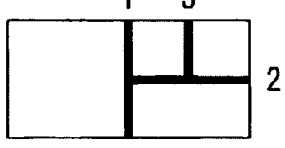 |
FIG. 5

| TWO-SIDED PRINT SETTING | FOLDING METHOD | BINDING METHOD | BINDING LOCATION | ANIMATION DATA |
|---|---|---|---|---|
| TwoSidedFlipX | F8-1 | SADDLE STITCHING | LEFT | anime001.gif |
| TwoSidedFlipY | F8-1 | SIDE STITCHING | TOP | anime002.gif |
| OneSidedFront | NONE | SIDE STITCHING | LEFT | anime003.gif |
| TwoSidedFlipX | F16-1 | SADDLE STITCHING | RIGHT | anime004.gif |
| ... | ... | ... | ... | ... |

FIG.15

POST-PRINTING PROCESS SUPPORT SYSTEM, POST-PRINTING PROCESS SUPPORT PROGRAM, AND POST-PRINTING PROCESS SUPPORT METHOD

BACKGROUND

1. Technical Field

The present invention relates to a system, a program, and a method which support a post-printing process, and more particularly to a post-printing process support system, a post-printing process support program, and a post-printing process support method in which even an inexperienced user can reliably perform a process which should be performed after printing.

2. Related Art

A print setting for performing complicated printing, such as bookbinding printing and manual two-sided printing, are generally performed using a print setting user interface of a printer driver. However, a user, who is new to and thus unfamiliar with a print setting and operation, makes an error in the setting, and often tends to fruitlessly repeat a printing process. Consequently, many of the existing printer drivers include a so-called preview function to display a print result, obtained from the print setting, on the monitor of a personal computer before printing is executed.

For example, an invention disclosed in JP-A-11-20272, intended for supporting manual two-sided printing, is configured as follows. That is, to lead to an operator to reset paper having had the front surface printed, in consideration of an image direction relative to the paper, a paper feed entrance, a first or second surface of the paper to be fed, a paper feed direction, and a binding location, how to place the paper, which is to be reset, on the paper feed entrance is displayed.

However, the invention disclosed in JP-A-11-20272 is adapted to display a preview image using a static image, and it is therefore difficult to comprehend the procedure, which is not sufficient for an inexperienced user to reliably perform the manual two-sided printing.

Besides, the same problem is also assumed to occur when the bookbinding printing is performed. In other words, when a bookbinding operation procedure is incorrectly executed and a print is thus erroneously cut, the printing must be restarted.

Additionally, the same problem is also assumed to occur when distribution printing is performed. In other words, prints need to be collected from printers after the distribution printing is performed, but an erroneous collection order necessitates the operation of straightening out the prints collected.

SUMMARY

An advantage of some aspects of the invention is to provide a post-printing process support system, a post-printing process support program, and a post-printing process support method in which even an inexperienced user can reliably perform a process which should be performed after printing.

Aspect 1

A post-printing process support system according to Aspect 1, which supports a post-printing process relating to a print medium, comprises: a print setting information acquisition section which acquires print setting information including a setting relating to a print format; an animation data generation section which generates, based on the print setting information acquired by the print setting information acquisition section, animation data which shows a post-printing process procedure relating to the print medium having been printed based on the print setting information; and an animation image display section which displays an animation image based on the animation data generated by the animation data generation section.

With such a configuration, the print setting information acquisition section acquires print setting information. The animation data generation section generates, based on the print setting information acquired, animation data which shows a post-printing process procedure relating to the print medium which has been printed based on the print setting information. And, the animation image display section displays an animation image based on the animation data generated.

A post-printing process procedure relating to a print medium is thereby displayed through an animation image, which therefore makes it easier to comprehend the process procedure than in the related art. The effect can thus be obtained that even an inexperienced user can relatively reliably perform a process which should be performed after printing.

As used herein, the term print format refers to the appearance of a print output as the final outcome from a pre-printing process (pre-press), a printing process (press), and a post-printing process (post-press). Besides, the setting relating to the print format includes, for example, a setting relating to imposition, or a setting relating to the method of folding, cutting, or binding a print medium. The same applies hereafter to a post-printing process support system according to Aspect 7, a post-printing process support apparatus according to Aspects 8 and 14, a post-printing process support program according to Aspect 15 and 21, a storage medium according to Aspects 22 and 28, and a post-printing process support method according to Aspects 29, 30, 36, and 37.

The term print setting information refers to information which defines the behavior (operation) of an apparatus for use in the pre-printing process (pre-press), the printing process (press), and the post-printing process (post-press), and which includes a setting relating to a print format to be designated or set when the print medium is printed. For example, a variety of information to be transferred by a print job ticket falls under this information. The same applies hereafter to a post-printing process support system according to Aspect 7, a post-printing process support apparatus according to Aspects 8 and 14, a post-printing process support program according to Aspect 15 and 21, a storage medium according to Aspects 22 and 28, and a post-printing process support method according to Aspects 29, 30, 36, and 37.

The print setting information acquisition section may adopt any configuration so long as it is adapted to acquire print setting information. For example, the print setting information acquisition section may be adapted to input print setting information from an input device or the like, may be adapted to obtain or receive print setting information from an external device or the like, or may be adapted to read print setting information from a storage device, a storage medium, or the like. Accordingly, the term acquisition includes input, obtainment, reception, and read. The same applies hereafter to a post-printing process support system according to Aspect 7 and a post-printing process support apparatus according to Aspects 8 and 14.

The term print medium includes a medium onto which a recording agent is output when printing is performed. For example, sheet-like printing paper made of paper, plastics, or the like falls under this kind of medium. In addition, the term print medium also includes thermosensitive paper. The same applies hereafter to a post-printing process support system according to Aspect 7, a post-printing process support apparatus according to Aspects 8 and 14, a post-printing process support program according to Aspect 15 and 21, a storage medium according to Aspects 22 and 28, and a post-printing process support method according to Aspects 29, 30, 36, and 37.

The term animation image refers to a moving image in which the movement of an image is shown in succession. The display of the animation image can be realized, for example, by displaying a plurality of static images in succession at regular timed intervals in a predetermined order. The same applies hereafter to a post-printing process support system according to Aspect 7, a post-printing process support apparatus according to Aspects 8 and 14, a post-printing process support program according to Aspect 15 and 21, a storage medium according to Aspects 22 and 28, and a post-printing process support method according to Aspects 29, 30, 36, and 37.

This system may be adapted to be realized as a single apparatus, terminal, or another device, or may be adapted to be realized as a network system which provides a communicable connection between a plurality of apparatuses, terminals, or other devices. In the latter case, the components, if communicably connected to one another, can belong to any of the plurality of devices or the like. The same applies hereafter to a post-printing process support system according to Aspect 7.

Aspect 2

A post-printing process support system of Aspect 2 is according to the post-printing process support system of Aspect 1, wherein the print setting information includes a setting relating to a method of folding the print medium, and the animation data generation section generates, based on the print setting information acquired by the print setting information acquisition section, animation data which shows a procedure for folding the print medium having been printed based on the print setting information.

With such a configuration, the animation data generation section generates animation data which shows a procedure for folding the print medium having been printed based on the print setting information.

The effect can thereby be obtained that even an inexperienced user can relatively reliably perform the operation of folding a print medium.

Aspect 3

A post-printing process support system of Aspect 3 is according to the post-printing process support system of Aspect 1, wherein the print setting information includes a setting relating to a method of cutting the print medium, and the animation data generation section generates, based on the print setting information acquired by the print setting information acquisition section, animation data which shows a procedure for cutting the print medium having been printed based on the print setting information.

With such a configuration, the animation data generation section generates animation data which shows a procedure for cutting the print medium having been printed based on the print setting information.

The effect can thereby be obtained that even an inexperienced user can relatively reliably perform the operation of cutting a print medium.

Aspect 4

A post-printing process support system of Aspect 4 is according to the post-printing process support system of Aspect 1, wherein the print setting information includes a setting relating to a method of binding the print medium, and the animation data generation section generates, based on the print setting information acquired by the print setting information acquisition section, animation data which shows a procedure for binding the print medium having been printed based on the print setting information.

With such a configuration, the animation data generation section generates animation data which shows a procedure for binding the print medium having been printed based on the print setting information.

The effect can thereby be obtained that even an inexperienced user can relatively reliably perform the operation of binding a print medium.

Aspect 5

A post-printing process support system of Aspect 5 is according to the post-printing process support system of Aspect 1, wherein the print setting information includes a setting relating to two-sided printing, and the animation data generation section generates, based on the print setting information acquired by the print setting information acquisition section, animation data which shows a procedure for feeding the print medium to a printing device when the print medium having had one side printed is fed again to the printing device to print the other side based on the print setting information.

With such a configuration, the animation data generation section generates animation data which shows a procedure for feeding the print medium to a printing device when the print medium having had one side printed is fed again to the printing device to print the other side based on the print setting information.

The effect can thereby be obtained that even an inexperienced user can relatively reliably perform the operation of feeding a print medium to the printing device when manual two-sided printing is performed.

Aspect 6

A post-printing process support system of Aspect 6 is according to the post-printing process support system of Aspect 1, wherein the print setting information includes a setting relating to distribution printing, and the animation data generation section generates, based on the print setting information acquired by the print setting information acquisition section, animation data which shows a procedure for collecting the print medium, having been distribution printed using a plurality of printing devices, based on the print setting information.

With such a configuration, the animation data generation section generates animation data which shows a procedure for collecting the print medium, having been distribution printed using a plurality of printing devices, based on the print setting information.

The effect can thereby be obtained that even an inexperienced user can relatively reliably perform the operation of collecting a print medium when distribution printing is performed.

Aspect 7

A post-printing process support system according to Aspect 7, which supports a post-printing process relating to a print medium, comprises: a print setting information acquisition section which acquires print setting information including a setting relating to a print format; an animation data storage section which stores animation data which shows a post-printing process procedure relating to the print medium, the animation data being related to print format information which indicates the print format; an animation data retrieval section which retrieves the animation data from the animation data storage section based on the print setting information acquired by the print setting information acquisition section; and an animation image display section which displays an animation image based on the animation data retrieved by the animation data retrieval section.

With such a configuration, the print setting information acquisition section acquires print setting information, and the animation data retrieval section retrieves the animation data from the animation data storage section based on the print setting information acquired. As a result, when the corresponding animation data has been retrieved, the animation image display section displays an animation image based on the animation data retrieved.

A post-printing process procedure relating to a print medium is thereby displayed through an animation image, which therefore makes it easier to comprehend the process procedure than in the related art. The effect can thus be obtained that even an inexperienced user can relatively reliably perform a process which should be performed after printing.

The animation data storage section stores animation data by any means and at any time. The animation data storage section may have animation data pre-stored therein, or may be adapted to store animation data, for example, by an external input at the time of activation of this system, instead of having animation data pre-stored therein. The same applies hereafter to a post-printing process support apparatus according to Aspect 14.

Aspect 8

A post-printing process support apparatus according to Aspect 8, which supports a post-printing process relating to a print medium, comprises: a print setting information acquisition section which acquires print setting information including a setting relating to a print format; an animation data generation section which generates, based on the print setting information acquired by the print setting information acquisition section, animation data which shows a post-printing process procedure relating to the print medium having been printed based on the print setting information; and an animation image display section which displays an animation image based on the animation data generated by the animation data generation section.

With such a configuration, it is possible to obtain the same operation and effect as those of the post-printing process support system of Aspect 1.

Aspect 9

A post-printing process support apparatus of Aspect 9 is according to the post-printing process support apparatus of Aspect 8, wherein the print setting information includes a setting relating to a method of folding the print medium, and the animation data generation section generates, based on the print setting information acquired by the print setting information acquisition section, animation data which shows a procedure for folding the print medium having been printed based on the print setting information.

With such a configuration, it is possible to obtain the same operation and effect as those of the post-printing process support system of Aspect 2.

Aspect 10

A post-printing process support apparatus of Aspect 10 is according to the post-printing process support apparatus of Aspect 8, wherein the print setting information includes a setting relating to a method of cutting the print medium, and the animation data generation section generates, based on the print setting information acquired by the print setting information acquisition section, animation data which shows a procedure for cutting the print medium having been printed based on the print setting information.

With such a configuration, it is possible to obtain the same operation and effect as those of the post-printing process support system of Aspect 3.

Aspect 11

A post-printing process support apparatus of Aspect 11 is according to the post-printing process support apparatus of Aspect 8, wherein the print setting information includes a setting relating to a method of binding the print medium, and the animation data generation section generates, based on the print setting information acquired by the print setting information acquisition section, animation data which shows a procedure for binding the print medium having been printed based on the print setting information.

With such a configuration, it is possible to obtain the same operation and effect as those of the post-printing process support system of Aspect 4.

Aspect 12

A post-printing process support apparatus of Aspect 12 is according to the post-printing process support apparatus of Aspect 8, wherein the print setting information includes a setting relating to two-sided printing, and the animation data generation section generates, based on the print setting information acquired by the print setting information acquisition section, animation data which shows a procedure for feeding the print medium to a printing device when the print medium having had one side printed is fed again to the printing device to print the other side based on the print setting information.

With such a configuration, it is possible to obtain the same operation and effect as those of the post-printing process support system of Aspect 5.

Aspect 13

A post-printing process support apparatus of Aspect 13 is according to the post-printing process support apparatus of Aspect 8, wherein the print setting information includes a setting relating to distribution printing, and the animation data generation section generates, based on the print setting information acquired by the print setting information acquisition section, animation data which shows a procedure for collecting the print medium, having been distribution printed using a plurality of printing devices, based on the print setting information.

With such a configuration, it is possible to obtain the same operation and effect as those of the post-printing process support system of Aspect 6.

Aspect 14

A post-printing process support apparatus of Aspect 14, which supports a post-printing process relating to a print medium, comprises: a print setting information acquisition section which acquires print setting information including a setting relating to a print format; an animation data storage section which stores animation data which shows a post-printing process procedure relating to the print medium, the animation data being related to print format information which indicates the print format; an animation data retrieval section which retrieves the animation data from the animation data storage section based on the print setting information acquired by the print setting information acquisition section; and an animation image display section which displays an animation image based on the animation data retrieved by the animation data retrieval section.

With such a configuration, it is possible to obtain the same operation and effect as those of the post-printing process support system of Aspect 7.

Aspect 15

A post-printing process support program according to Aspect 15, which supports a post-printing process relating to a print medium, comprises a program for allowing a computer to execute a process which includes: a print setting information acquisition step for acquiring print setting information including a setting relating to a print format; an animation data generation step for generating, based on the print setting information acquired in the print setting information acquisition step, animation data which shows a post-printing process procedure relating to the print medium having been printed based on the print setting information; and an animation image display step for displaying an animation image based on the animation data generated in the animation data generation step.

With such a configuration, when the computer reads a program and executes a process in accordance with the program read, it is possible to obtain the same operation and effect as those of the post-printing process support system of Aspect 1.

The print setting information acquisition step may adopt any mode so long as it is adapted to acquire print setting information. For example, the print setting information acquisition step may be adapted to receive print setting information from an input device or the like, may be adapted to obtain or receive print setting information from an external device or the like, or may be adapted to read print setting information from a storage device, a storage medium, or the like. Accordingly, the term acquisition includes at least input, obtainment, reception, and read. The same applies hereafter to a post-printing process support program according to Aspect 21, a storage medium according to Aspects 22 and 28, and a post-printing process support method according to Aspects 29, 30, 36, and 37.

Aspect 16

A post-printing process support program of Aspect 16 is according to the post-printing process support program of Aspect 15, wherein the print setting information includes a setting relating to a method of folding the print medium, and the animation data generation step generates, based on the print setting information acquired in the print setting information acquisition step, animation data which shows a procedure for folding the print medium having been printed based on the print setting information.

With such a configuration, when the computer reads a program and executes a process in accordance with the program read, it is possible to obtain the same operation and effect as those of the post-printing process support system of Aspect 2.

Aspect 17

A post-printing process support program of Aspect 17 is according to the post-printing process support program of Aspect 15, wherein the print setting information includes a setting relating to a method of cutting the print medium, and the animation data generation step generates, based on the print setting information acquired in the print setting information acquisition step, animation data which shows a procedure for cutting the print medium having been printed based on the print setting information.

With such a configuration, when the computer reads a program and executes a process in accordance with the program read, it is possible to obtain the same operation and effect as those of the post-printing process support system of Aspect 3.

Aspect 18

A post-printing process support program of Aspect 18 is according to the post-printing process support program of Aspect 15, wherein the print setting information includes a setting relating to a method of binding the print medium, and the animation data generation step generates, based on the print setting information acquired in the print setting information acquisition step, animation data which shows a procedure for binding the print medium having been printed based on the print setting information.

With such a configuration, when the computer reads a program and executes a process in accordance with the program read, it is possible to obtain the same operation and effect as those of the post-printing process support system of Aspect 4.

Aspect 19

A post-printing process support program of Aspect 19 is according to the post-printing process support program of Aspect 15, wherein the print setting information includes a setting relating to two-sided printing, and the animation data generation step generates, based on the print setting information acquired in the print setting information acquisition step, animation data which shows a procedure for feeding the print medium to a printing device when the print medium having had one side printed is fed again to the printing device to print the other side based on the print setting information.

With such a configuration, when the computer reads a program and executes a process in accordance with the program read, it is possible to obtain the same operation and effect as those of the post-printing process support system of Aspect 5.

Aspect 20

A post-printing process support program of Aspect 20 is according to the post-printing process support program of Aspect 15, wherein the print setting information includes a setting relating to distribution printing, and the animation data generation step generates, based on the print setting information acquired in the print setting information acquisition step, animation data which shows a procedure for collecting the print medium, having been distribution printed using a plurality of printing devices, based on the print setting information.

With such a configuration, when the computer reads a program and executes a process in accordance with the program read, it is possible to obtain the same operation and effect as those of the post-printing process support system of Aspect 6.

Aspect 21

A post-printing process support program according to Aspect 21, which supports a post-printing process relating to a print medium, comprises a program for allowing a computer to execute a process which includes: a print setting information acquisition step for acquiring print setting information including a setting relating to a print format; an animation data retrieval step for retrieving, based on the print setting information acquired in the print setting information acquisition step, animation data, which shows a post-printing process procedure relating to the print medium, from an animation data storage section which stores the animation data, which is related to print format information which indicates the print format; and an animation image display step for displaying an animation image based on the animation data retrieved in the animation data retrieval step.

With such a configuration, when the computer reads a program and executes a process in accordance with the program read, it is possible to obtain the same operation and effect as those of the post-printing process support system of Aspect 7.

Aspect 22

A computer-readable storage medium according to Aspect 22, which stores a post-printing process support program which supports a post-printing process relating to a print medium, stores a program for allowing a computer to execute a process which includes: a print setting information acquisition step for acquiring print setting information including a setting relating to a print format; an animation data generation step for generating, based on the print setting information acquired in the print setting information acquisition step, animation data which shows a post-printing process procedure relating to the print medium having been printed based on the print setting information; and an animation image display step for displaying an animation image based on the animation data generated in the animation data generation step.

With such a configuration, when the computer reads a program from the storage medium and executes a process in accordance with the program read, it is possible to obtain the same operation and effect as those of the post-printing process support system of Aspect 1.

Aspect 23

A storage medium of Aspect 23 is according to the storage medium of Aspect 22, wherein the print setting information includes a setting relating to a method of folding the print medium, and the animation data generation step generates, based on the print setting information acquired in the print setting information acquisition step, animation data which shows a procedure for folding the print medium having been printed based on the print setting information.

With such a configuration, when the computer reads a program from the storage medium and executes a process in accordance with the program read, it is possible to obtain the same operation and effect as those of the post-printing process support system of Aspect 2.

Aspect 24

A storage medium of Aspect 24 is according to the storage medium of Aspect 22, wherein the print setting information includes a setting relating to a method of cutting the print medium, and the animation data generation step generates, based on the print setting information acquired in the print setting information acquisition step, animation data which shows a procedure for cutting the print medium having been printed based on the print setting information.

With such a configuration, when the computer reads a program from the storage medium and executes a process in accordance with the program read, it is possible to obtain the same operation and effect as those of the post-printing process support system of Aspect 3.

Aspect 25

A storage medium of Aspect 25 is according to the storage medium of Aspect 22, wherein the print setting information includes a setting relating to a method of binding the print medium, and the animation data generation step generates, based on the print setting information acquired in the print setting information acquisition step, animation data which shows a procedure for binding the print medium having been printed based on the print setting information.

With such a configuration, when the computer reads a program from the storage medium and executes a process in accordance with the program read, it is possible to obtain the same operation and effect as those of the post-printing process support system of Aspect 4.

Aspect 26

A storage medium of Aspect 26 is according to the storage medium of Aspect 22, wherein the print setting information includes a setting relating to two-sided printing, and the animation data generation step generates, based on the print setting information acquired in the print setting information acquisition step, animation data which shows a procedure for feeding the print medium to a printing device when the print medium having had one side printed is fed again to the printing device to print the other side based on the print setting information.

With such a configuration, when the computer reads a program from the storage medium and executes a process in accordance with the program read, it is possible to obtain the same operation and effect as those of the post-printing process support system of Aspect 5.

Aspect 27

A storage medium of Aspect 27 is according to the storage medium of Aspect 22, wherein the print setting information includes a setting relating to distribution printing, and the animation data generation step generates, based on the print setting information acquired in the print setting information acquisition step, animation data which shows a procedure for collecting the print medium, having been distribution printed using a plurality of printing devices, based on the print setting information.

With such a configuration, when the computer reads a program from the storage medium and executes a process in accordance with the program read, it is possible to obtain the same operation and effect as those of the post-printing process support system of Aspect 6.

Aspect 28

A computer-readable storage medium according to Aspect 28, which stores a post-printing process support program which supports a post-printing process relating to a print medium, stores a program for allowing a computer to execute a process which includes: a print setting information acquisition step for acquiring print setting information including a setting relating to a print format; an animation data retrieval step for retrieving, based on the print setting information acquired in the print setting information acquisition step, animation data, which shows a post-printing process procedure relating to the print medium, from a animation data storage section which stores the animation data, which is related to print format information which indicates the print format; and an animation image display step for displaying an animation image based on the animation data retrieved in the animation data retrieval step.

With such a configuration, when the computer reads a program from the storage medium and executes a process in accordance with the program read, it is possible to obtain the same operation and effect as those of the post-printing process support system of Aspect 7.

Aspect 29

A post-printing process support method according to Aspect 29, which supports a post-printing process relating to a print medium, comprises: a print setting information acquisition step for acquiring print setting information including a setting relating to a print format; an animation data generation step for generating, based on the print setting information acquired in the print setting information acquisition step, animation data which shows a post-printing process procedure relating to the print medium having been printed based on the print setting information; and an animation image display step for displaying an animation image based on the animation data generated in the animation data generation step.

It is thereby possible to obtain the same effect as that of the post-printing process support system of Aspect 1.

Aspect 30

A post-printing process support method according to Aspect 30, which supports a post-printing process relating to a print medium, comprises: a print setting information acquisition step in which a calculation section acquires print setting information including a setting relating to a print format; an animation data generation step in which the calculation section generates, based on the print setting information acquired in the print setting information acquisition step, animation data which shows a post-printing process procedure relating to the print medium having been printed based on the print setting information; and an animation image display step in which the calculation section displays an animation image on a display section based on the animation data generated in the animation data generation step.

It is thereby possible to obtain the same effect as that of the post-printing process support system of Aspect 1.

Aspect 31

A post-printing process support method of Aspect 31 is according to the post-printing process support method of Aspect 29, wherein the print setting information includes a setting relating to a method of folding the print medium, and the animation data generation step generates, based on the print setting information acquired in the print setting information acquisition step, animation data which shows a procedure for folding the print medium having been printed based on the print setting information.

It is thereby possible to obtain the same effect as that of the post-printing process support system of Aspect 2.

Aspect 32

A post-printing process support method of Aspect 32 is according to the post-printing process support method of Aspect 29, wherein the print setting information includes a setting relating to a method of cutting the print medium, and the animation data generation step generates, based on the print setting information acquired in the print setting information acquisition step, animation data which shows a procedure for cutting the print medium having been printed based on the print setting information.

It is thereby possible to obtain the same effect as that of the post-printing process support system of Aspect 3.

Aspect 33

A post-printing process support method of Aspect 33 is according to the post-printing process support method of Aspect 29, wherein the print setting information includes a setting relating to a method of binding the print medium, and the animation data generation step generates, based on the print setting information acquired in the print setting information acquisition step, animation data which shows a procedure for binding the print medium having been printed based on the print setting information.

It is thereby possible to obtain the same effect as that of the post-printing process support system of Aspect 4.

Aspect 34

A post-printing process support method of Aspect 34 is according to the post-printing process support method of Aspect 29, wherein the print setting information includes a setting relating to two-sided printing, and the animation data generation step generates, based on the print setting information acquired in the print setting information acquisition step, animation data which shows a procedure for feeding the print medium to a printing device when the print medium having had one side printed is fed again to the printing device to print the other side based on the print setting information.

It is thereby possible to obtain the same effect as that of the post-printing process support system of Aspect 5.

Aspect 35

A post-printing process support method of Aspect 35 is according to the post-printing process support method of Aspect 29, wherein the print setting information includes a setting relating to distribution printing, and the animation data generation step generates, based on the print setting information acquired in the print setting information acquisition step, animation data which shows a procedure for collecting the print medium, having been distribution printed using a plurality of printing devices, based on the print setting information.

It is thereby possible to obtain the same effect as that of the post-printing process support system of Aspect 6.

Aspect 36

A post-printing process support method according to Aspect 36, which supports a post-printing process relating to a print medium, comprises: a print setting information acquisition step for acquiring print setting information including a setting relating to a print format; an animation data retrieval step for retrieving, based on the print setting information acquired in the print setting information acquisition step, animation data, which shows a post-printing process procedure relating to the print medium, from a animation data storage section which stores the animation data, which is related to print format information which indicates the print format; and an animation image display step for displaying an animation image based on the animation data retrieved in the animation data retrieval step.

It is thereby possible to obtain the same effect as that of the post-printing process support system of Aspect 7.

Aspect 37

A post-printing process support method according to Aspect 37, which supports a post-printing process relating to a print medium, comprises: a print setting information acquisition step in which a calculation section acquires print setting information including a setting relating to a print format; an animation data retrieval step in which the calculation section retrieves, based on the print setting information acquired in the print setting information acquisition step, animation data, which shows a post-printing process procedure relating to the print medium, from a animation data storage section which stores the animation data, which is related to print format information which indicates the print format; and an animation image display step in which the calculation section displays an animation image on a display section based on the animation data retrieved in the animation data retrieval step.

It is thereby possible to obtain the same effect as that of the post-printing process support system of Aspect 7.

BRIEF DESCRIPTION OF THE DRAWINGS

The invention will be described with reference to the accompanying drawings, wherein like numbers reference like elements.

FIG. 4 is a diagram showing a setting example of a two-sided print setting.

FIG. 5 is a diagram showing a setting example of a folding method.

FIG. 15 is a diagram showing the data structure of an animation data management table 700.

DESCRIPTION OF EXEMPLARY EMBODIMENTS

A first embodiment of the invention will hereafter be described with reference to the drawings. FIGS. 1 to 9I are diagrams showing the first embodiment of a post-printing process support system, a post-printing process support program, and a post-printing process support method according to an aspect of the invention.

Figure 1:
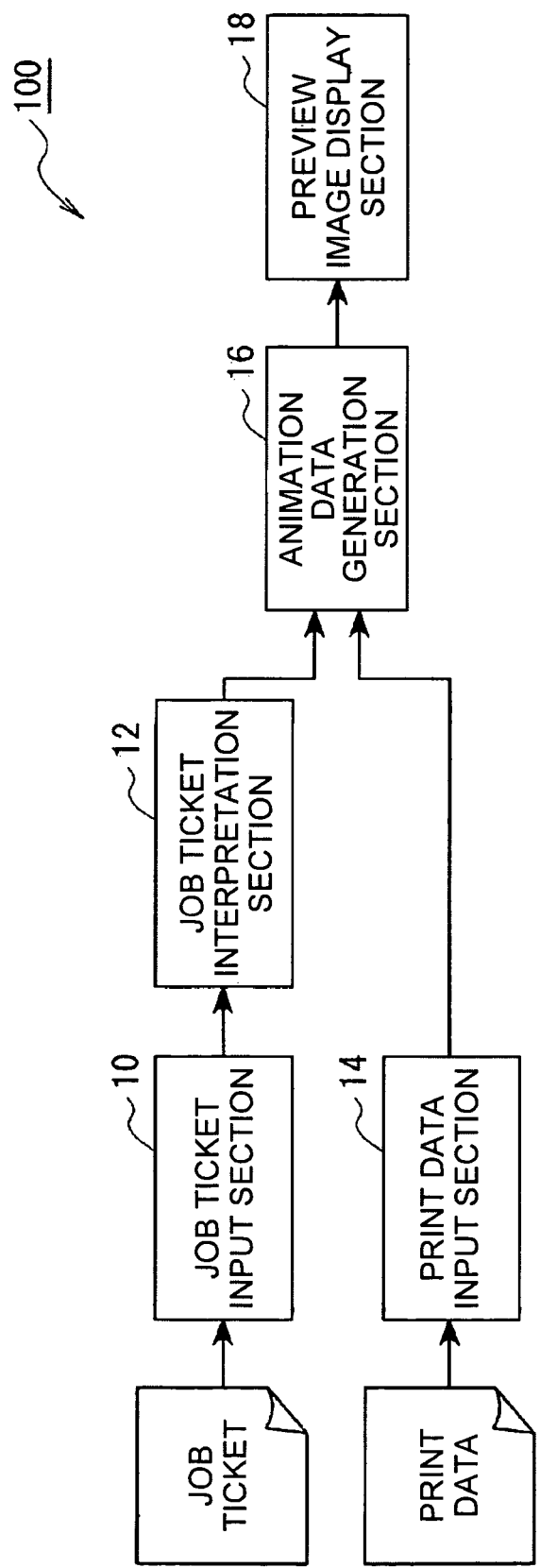
FIG. 1 is a functional block diagram showing the functional outline of a host terminal 100.

In this embodiment, the post-printing process support system, the post-printing process support program, and the post-printing process support method according to the aspect of the invention are applied to the case in which a preview image is displayed through animation based on a job ticket and print data, as shown in FIG. 1.

First, the functional outline of a host terminal 100 to which the invention is herein applied will be described with reference to FIG. 1.

FIG. 1 is a functional block diagram showing the functional outline of the host terminal 100.

As shown in FIG. 1, the host terminal 100 includes a job ticket input section 10 which inputs a job ticket including the setting of a print format, a job ticket interpretation section 12 which interprets the content of the job ticket input by the job ticket input section 10, and a print data input section 14 which inputs print data.

The host terminal 100 further includes an animation data generation section 16 which generates animation data based on the interpretation result of the job ticket interpretation section 12 and the print data input by the print data input section 14, and a preview image display section 18 which displays a preview image through animation based on the animation data generated by the animation data generation section 16.

The animation data generation section 16 generates a conceptual image of printing paper to be printed based on the job ticket and the print data, and generates animation data, which shows the procedure of a post-printing process (folding, cutting, and binding) relating to the printing paper, using the image generated.

The host terminal 100 is connected to a network printer (not shown) via a network.

Next the configuration of the host terminal 100 will be described in detail.

Figure 2:
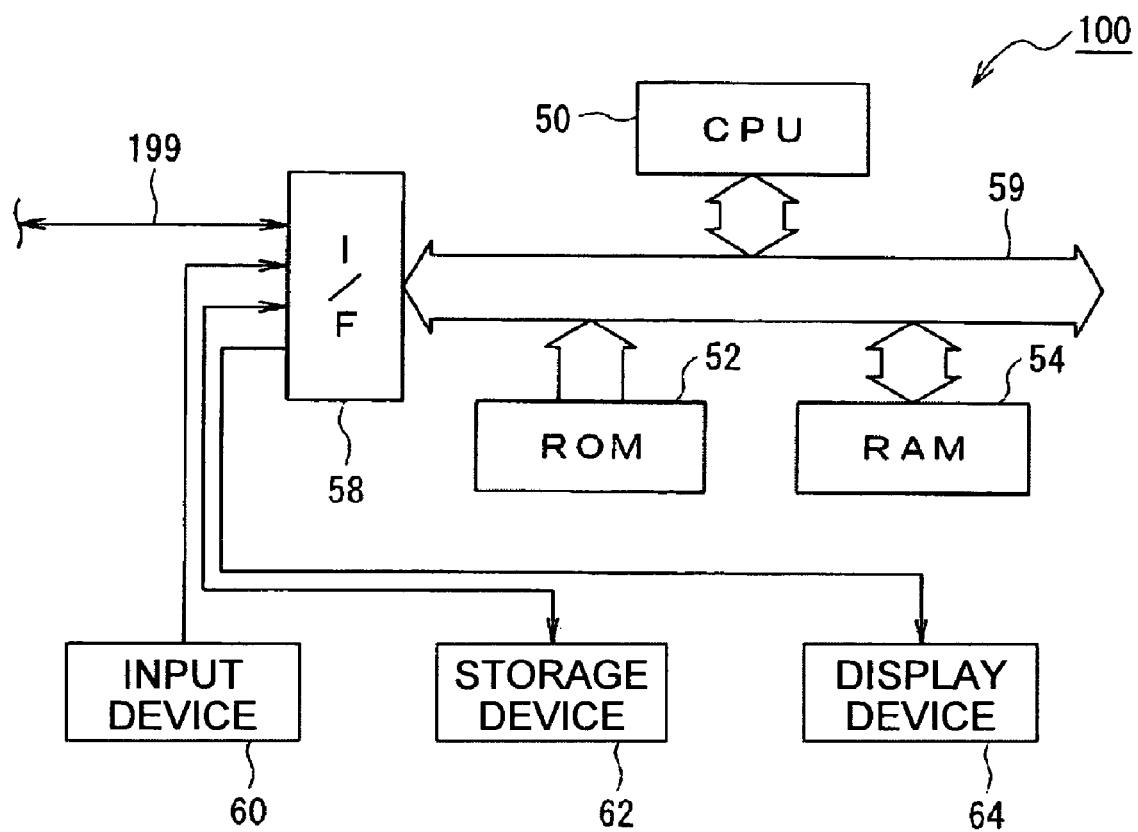
FIG. 2 is a block diagram showing the hardware configuration of the host terminal 100.

FIG. 2 is a block diagram showing the hardware configuration of the host terminal 100.

As shown in FIG. 2, the host terminal 100 includes a CPU 50 which controls the entire calculation and system based on a control program, a ROM 52 which pre-stores the control program, or the like of the CPU 50 in a predetermined region, a RAM 54 for storing data read from the ROM 52, or the like and a calculation result necessary in a calculation step in the CPU 50, and an I/F 58 which mediates the input/output of data with respect to an external device. These components are connected to one another by a bus 59 which is a signal line for transferring data, so as to exchange the data between the different components.

Connected to the I/F 58 are an input device 60 including a keyboard, a mouse, or the like, as a human interface with which data can be input, a storage device 62 which stores data, a table, and the like, a display device 64 which displays a screen based on an image signal, and a signal line for providing a connection to a network 199.

The structure of the job ticket will now be described.

Figure 3:
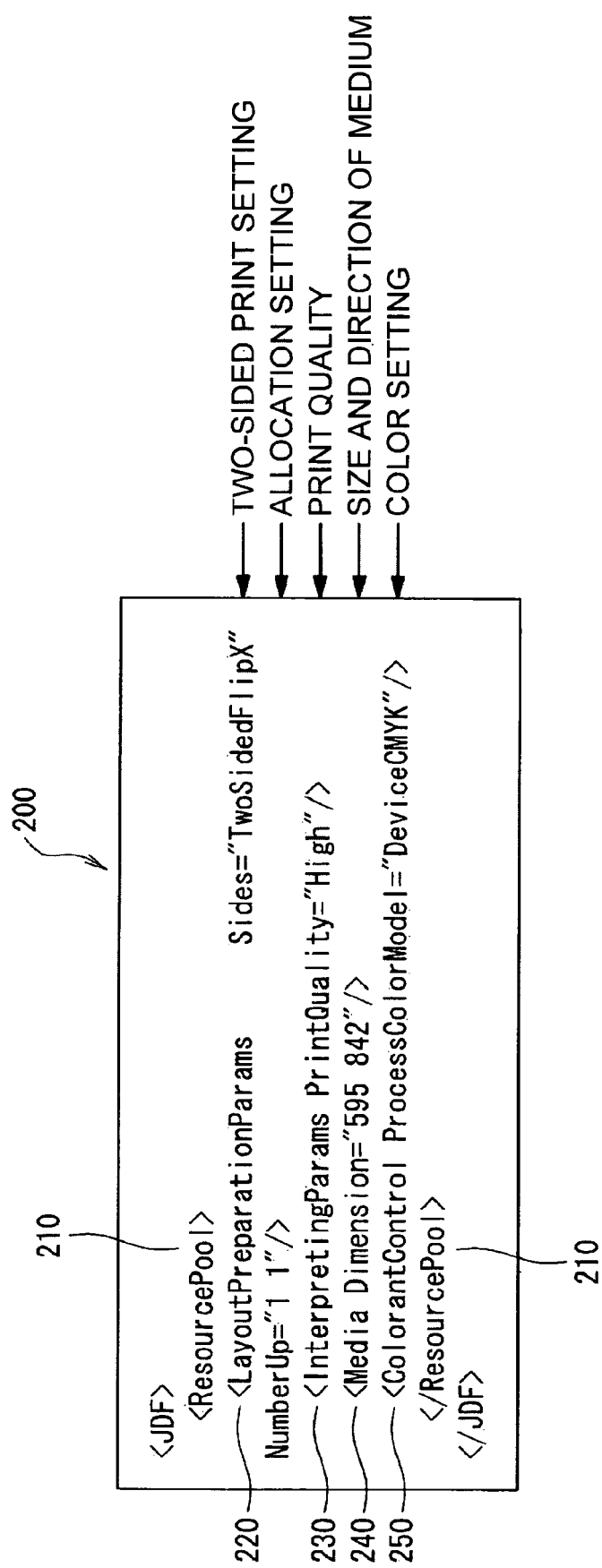
FIG. 3 is a diagram showing the data structure of a job ticket 200.

FIG. 3 is a diagram showing the data structure of a job ticket 200.

As shown in FIG. 3, the job ticket 200 sets a print format by describing a set of tags, a start tag and an end tag, in nested fashion between a predetermined start tag (e.g., <JDF>) and a predetermined end tag (e.g., </JDF>). The tags are described, for example, in a markup language such as XML (eXtensible Markup Language).

In the example of FIG. 3, between a set of tags 210, 210 indicating <ResourcePool>, a first tag 220 indicating <LayoutPreparation Params Sides="TwoDideFlipX" NumberUP="1"> describes the contents of a two-sided print setting and an allocated print setting. A second tag 230 <InterpretingParams PrintQuality="High"/> describes the content of print quality. A third tag 240 <Media Dimension="595 842"/> describes the size of the medium (printing paper). A fourth tag 250 <ColorantControl ProcessColor Model="DeviceCMYK"/> describes the content of the color setting. Similarly, although not shown, the methods of folding, cutting, and binding the printing paper can be set.

FIG. 4 is a diagram showing an example of the two-side print setting.

The upper description "OneSideFront" 310 of FIG. 4 means that one-sided printing is to be performed only on one surface of the printing paper. The middle description "TwoSideFlipX" 320 means that two-sided printing is to be performed so as to flip a page along the X axis of the printing paper. The lower description "TwoSideFlipY" 330 means that two-sided printing is to be performed so as to flip a page along the Y axis of the printing paper.

FIG. 5 is a diagram showing an example of setting the folding method.

The upper row of FIG. 5 shows a folding method, in the case where four pages are allocated to each of both surfaces of the printing paper, in which the printing paper is folded in half in the left and right direction, and further folded in half in the up and down direction. In this case, the folding method is set by describing, for example, <LayoutPreparationParams FoldCatalog="F8-1/" in the job ticket 200.

The lower row of FIG. 5 shows a folding method, in the case where eight pages are allocated to each of both surfaces of the printing paper, in which the printing paper is folded in half in the left and right direction, further folded in half in the up and down direction, and still further folded in half in the left and right direction. In this case, the folding method is set by describing, for example, <LayoutPreparationParams FoldCatalog="F16-1"/> in the job ticket 200.

Processes to be executed by the CPU 50 will now be described.

Figure 6:
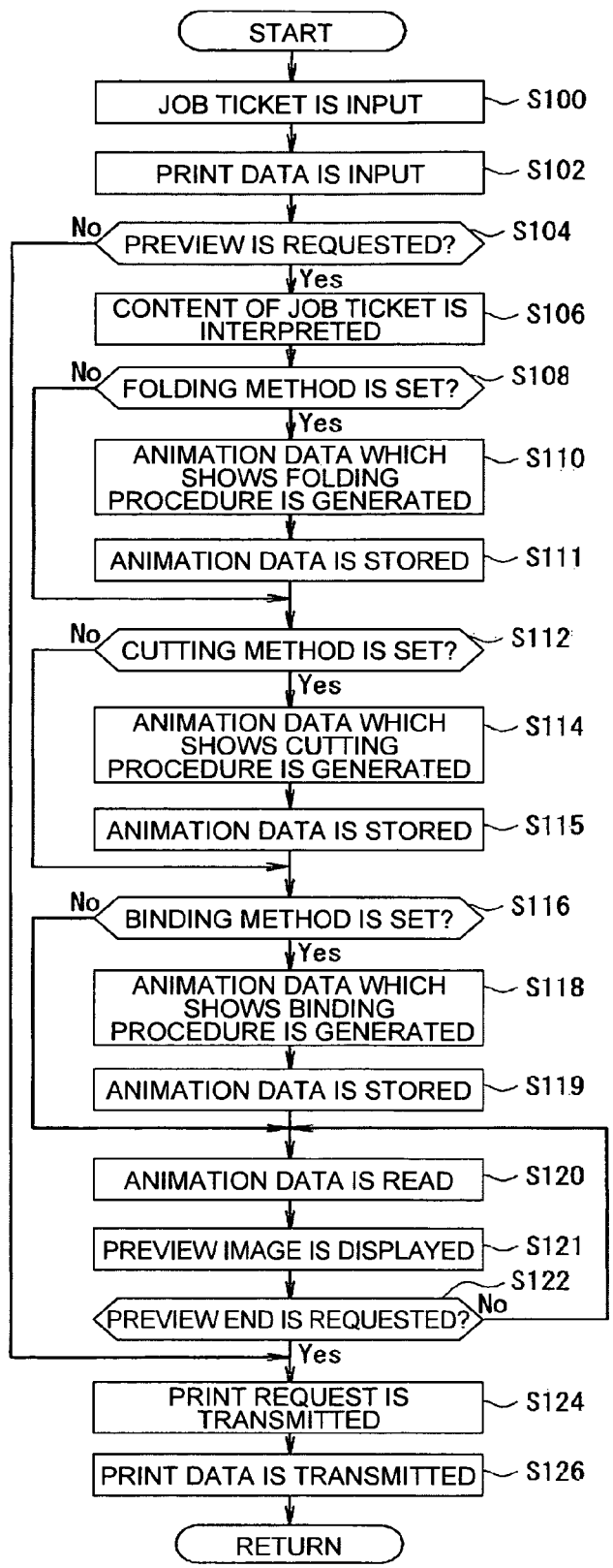
FIG. 6 is a flowchart showing a print request process.

The CPU 50, including a microprocessing unit (MPU) and the like, activates a predetermined program stored in a predetermined region of the ROM 52 and, according to the program, executes a print request process shown in the flowchart of FIG. 6.

FIG. 6 is a flowchart showing the print request process.

The print request process is the process of issuing a printing request to the network printer. When the CPU 50 executes the print request process, as shown in FIG. 6, the process first moves to step S100.

In step S100, a job ticket 200 is input, and the process moves to step S102, in which print data is input. The process then moves to step S104, in which it is determined whether or not a request has been issued to display a preview image. If it is determined that a request has been issued to display the preview image (Yes), the process moves to step S106.

In step S106, the content of the job ticket 200 input is interpreted, and the process moves to step S108, in which it is determined, based on the interpretation result of step S106, whether or not the job ticket 200 includes a folding method setting. If it is determined that a folding method setting is included (Yes), the process moves to step S110.

Figure 7:
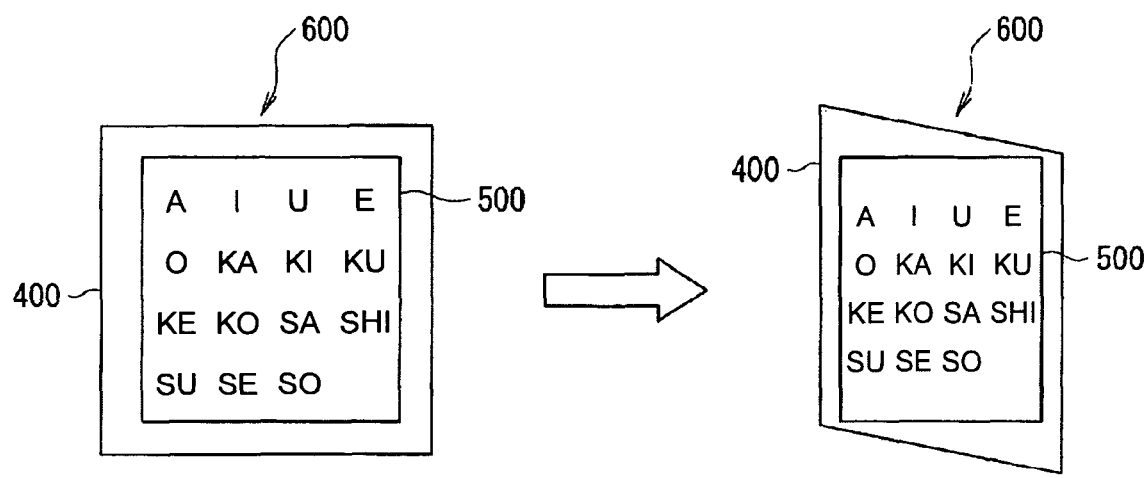
FIG. 7 is a diagram showing a conceptual image 600 obtained when a print content is not distorted.

FIG. 7 is a diagram showing a conceptual image 600 having a non-distorted print content.

In step S110, first, based on the print data input, as shown in FIG. 7, a conceptual image 600 of printing paper to be printed based on the job ticket 200 and the print data is generated, and the process moves to step S111, in which the animation data generated is stored in the storage device 62. For example, to distort the conceptual image 600, the configuration may be such that only a printing paper image 400 is distorted, while a print content image 500 is only changed in aspect ratio and not distorted at all. Although realism is thereby slightly spoiled, it is instead possible to reduce an information processing burden (image processing).

Figure 8:
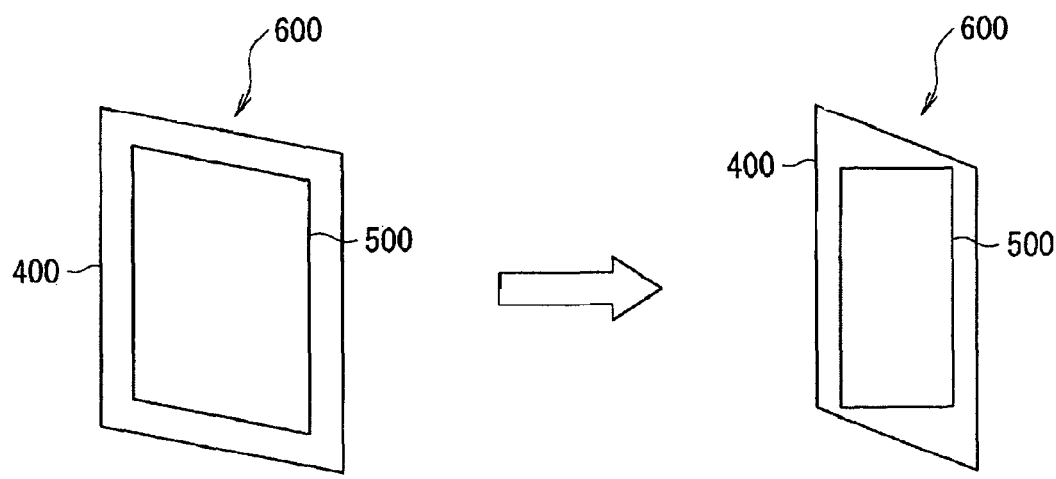
FIG. 8 is a diagram showing a conceptual image 600 obtained when the print content is distorted.
Figure 9A:
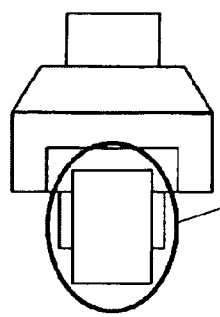
FIGS. 9A to 9I are diagrams showing the animation of a preview image.
Figure 9B:
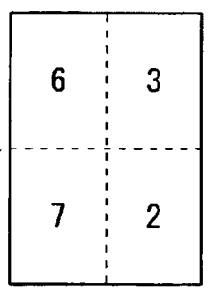
Figure 9C:
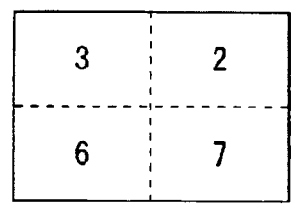
Figure 9D:
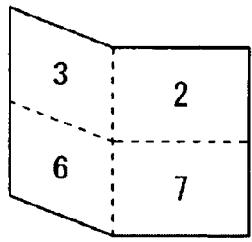
Figure 9E:
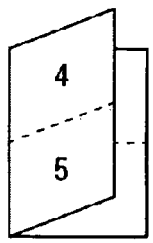
Figure 9F:
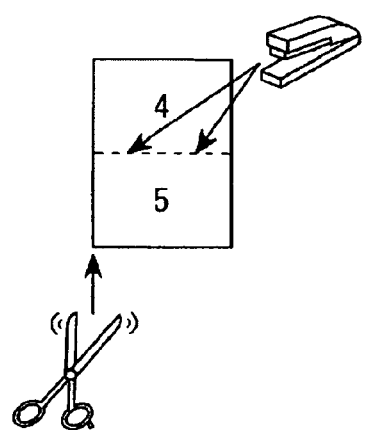
Figure 9G:
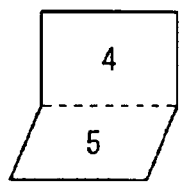
Figure 9H:
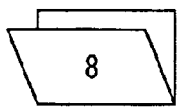
Figure 9I:
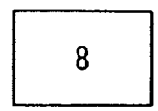

FIG. 8 is a diagram showing a conceptual image 600 having a distorted print content.

As shown in FIG. 8, the configuration may also be such that the print content image 500 is distorted in response to the amount of distortion of the printing paper image 400. For example, when the printing paper image 400 has a small distortion, it is considered that the print content image 500 can be seen even with the angle of such a distortion. Therefore, the print content image 500 is also distorted in response thereto, thus placing an importance on realism. However, when the printing paper image 400 has a greater distortion, it becomes difficult to visually recognize the print content image 500. Therefore, a schematic figure may be attached without distorting the print content image 500.

Since animation is realized by displaying a plurality of static images in succession, the larger number of static images, the larger number of conceptual images 600 which need to be created, and a matrix operation and the like which are accompanied thereby must also be performed more frequently. However, for example, when the number of conceptual images 600 is reduced to five instead of creating seven conceptual images 600 in order to realize one animation, it is then possible to reduce the information processing burden required to create two conceptual images 600.

In addition, when these three methods are combined as appropriate, the information processing burden can be reduced without spoiling realism so much.

Next, animation data, which shows the procedure of folding printing paper using the conceptual image 600 generated, is generated based on the folding method setting interpreted in step S106. The animation generation method is the simplest one in which animation data is generated by displaying a plurality of static images in succession as in a "flip book". Technically, animation can be realized using the extended format of a GIF format which is called an animation GIF. The animation GIF is disclosed in detail in the "Cover Sheet for the FIF89a Specification".

To return to FIG. 6, the process moves to step S112, in which it is determined, based on the interpretation result of step S106, whether or not a cutting method setting is included in the job ticket 200. If it is determined that a cutting method setting is included (Yes), the process moves to step S114.

In step S114, a conceptual image 600 is generated based on the print data input, and animation data, which shows the procedure of cutting printing paper using the conceptual image 600 generated, is generated based on the cutting method setting interpreted in step S106. The process then moves to step S115, in which the animation data generated is stored in the storage device 62. Here, when animation data has been generated in step S110, the animation data generated in step S110 is read from the storage device 62. Then, the animation data read and the animation data generated in step S114 are combined so as to make the procedures of folding and cutting printing paper consistent with one another in chronological order, and the combined animation data is stored in the storage device 62.

Next, the process moves to step S116, in which it is determined, based on the interpretation result of step S106, whether or not a binding method setting is included in the job ticket 200. If it is determined that a binding method setting is included (Yes), the process moves to step S118.

In step S118, a conceptual image 600 is generated based on the print data input, and animation data, which shows the procedure of binding printing paper using the conceptual image 600 generated, is generated based on the binding method setting interpreted in step S106. The process then moves to step S119, in which the animation data generated is stored in the storage device 62. Here, when animation data has been generated in steps S110 and S114, the animation data generated in steps S110 and S114 is read from the storage device 62. Then, the animation data read and the animation data generated in step S118 are combined so as to make the procedures of folding, cutting, and binding printing paper consistent with one another in chronological order, and the combined animation data is stored in the storage device 62.

Next, the process moves to step S120, in which the animation data generated in steps S110, S114, and S118 are read from the storage device 62. The process then moves to step S121, in which a preview image is displayed through animation on the display device 64 based on the animation data read. The process further moves to step S122, in which it is determined whether or not a request has been issued to end the display of the preview image. If a request has been issued to end the display of the preview image has been requested (Yes), the process moves to step S124.

The process moves to step S124 to transmit a print request to the network printer, and the process then moves to step S126 to transmit the job ticket 200 and the print data, which have been input, to the network printer. The series of process steps is thus brought to an end to return to the original process.

Conversely, if it is determined in step S122 that a request has not been issued to end the display of the preview image (No), the process moves to step S120.

Conversely, if it is determined in step S116 that the binding method setting is not included in the job ticket 200 (No), the process moves to step S120.

Conversely, if it is determined in step S112 that the cutting method setting is not included in the job ticket 200 (No), the process moves to step S116.

Conversely, if it is determined in step S108 that the folding method setting is not included in the job ticket 200 (No), the process moves to step S112.

Conversely, if it is determined in step S104 that a request has not been issued to display the preview image (No), the process moves to step S124.

The operation of this embodiment will now be described.

The operation of this embodiment will be described using as an example the case in which four pages are allocated to each of both surfaces of printing paper and the printing paper is to be folded in four for saddle stitching.

A user uses the host terminal 100 to input a job ticket 200 including folding, cutting and binding method settings, and print data corresponding thereto, and requests the display of a preview image.

In the host terminal 100, when the job ticket 200 and the print data are input to request the display of the preview image, the content of the job ticket 200 is interpreted through steps S106, S108, S112, and S116. It is then determined, based on the interpretation result, whether or not the folding, cutting, and binding method settings are included in the job ticket 200. Since these settings are included in the job ticket 200, through steps S110, S114, and S118, a conceptual image 600 is generated based on the print data input, and animation data, which shows the procedures of folding, cutting, and binding printing paper, is generated using the conceptual image 600 generated. Then, through step S121, the preview image is displayed through animation based on the animation data generated.

FIGS. 9A to 9I are diagrams showing the animation of a preview image.

In the preview image, images in FIGS. 9A to 9I are displayed in succession at regular timed intervals in the order named, thereby showing through animation the procedures of folding, cutting, and binding printing paper. The user can comprehend from the display of the images in FIGS. 9C to 9E that the printing paper is to be folded in half in the left and right direction, and from the display of the image in FIG. 9F that the printing paper is to be cut along the left edge into two pieces and that the two pieces of printing paper are to be stapled together along the center. Furthermore, the user can comprehend from the images in FIG. 9G to 9I that the printing paper is then folded in half in the up and down direction.

This embodiment is thus configured such that the job ticket 200 including the setting of the printing paper folding method is input, such that, based on the job ticket 200 input, animation data is generated which shows the procedure of folding the printing paper printed based on this job ticket 200, and such that a preview image is displayed through animation based on the animation data generated.

The procedure of folding printing paper is thereby displayed through animation, which therefore makes it easier than in the related art to comprehend the procedure of folding printing paper, so that even an inexperienced user can perform, without fail, the operation of folding printing paper.

The latest printing technique provides an apparatus which, based on a print setting, automatically sets a cutting machine and a folding machine and automatically executes the cutting and folding of printing paper. Since such an apparatus is for business use and thus expensive, a general user, particularly, a group of printer purchasers cannot easily afford to purchase the apparatus. By using the technique of this embodiment, it becomes possible to eliminate the need for the cutting machine and the folding machine and to support manual book binding by the general user.

Furthermore, this embodiment is configured such that a job ticket 200 including the setting of the printing paper cutting method is input, such that, based on the job ticket 200 input, animation data is generated which shows the procedure of cutting the printing paper printed based on this job ticket 200, and such that a preview image is displayed through animation based on the animation data generated.

The procedure of cutting printing paper is thereby displayed through animation, which therefore makes it easier than in the related art to comprehend the procedure of cutting printing paper, so that even an inexperienced user can perform, without fail, the operation of cutting printing paper.

Still furthermore, this embodiment is configured such that a job ticket 200 including the setting of the printing paper binding method is input, such that, based on the job ticket 200 input, animation data is generated which shows the procedure of binding the printing paper printed based on this job ticket 200, and such that a preview image is displayed through animation based on the animation data generated.

The procedure of binding printing paper is thereby displayed through animation, which therefore makes it easier than in the related art to comprehend the procedure of binding printing paper, so that even an inexperienced user can perform, without fail, the operation of binding printing paper.

Still furthermore, this embodiment is configured such that, based on print data, a conceptual image 600 of printing paper to be printed based on a job ticket 200 and the print data is generated, and such that animation data is generated using the conceptual image 600 generated.

The procedures are thereby displayed in response to a print result, which therefore makes it still easier to comprehend the procedures of folding, cutting, and binding the printing paper.

In the first embodiment, the job ticket input section 10 and step S100 correspond to the print setting information acquisition section according to Aspects 1 to 4 and 8 to 11, step S100 corresponds to the print setting information acquisition step according to Aspects 15 to 18, 22 to 25, and 29 to 33, and the animation data generation section 16 and steps S108 to S118 correspond to the animation data generation section according to Aspects 1 to 4 and 8 to 11. Besides, steps S108 to S118 correspond to the animation data generation step according to Aspects 15 to 18, 22 to 25, and 29 to 33, and the preview image display section 18 and step S121 correspond to the animation image display section according to Aspect 1 or 8.

Additionally, in the first embodiment, step S121 corresponds to the animation image display step according to Aspects 15, 22, 29 or 30, the printing paper corresponds to the printing medium according to Aspects 1 to 4, 8 to 11, 15 to 18, 22 to 25, and 29 to 33, and the job ticket 200 corresponds to the print setting information according to Aspects 1 to 4, 8 to 11, 15 to 18, 22 to 25, and 29 to 33. Besides, the CPU 50 corresponds to the calculation section according to Aspect 30, and the display device 64 corresponds to the display section according to Aspect 30.

A second embodiment of the invention will now be described with reference to the drawings. FIGS. 10 and 11A to 11D are diagrams showing the second embodiment of a post-printing process support system, a post-printing process support program, and a post-printing process support method according to an aspect of the invention.

In this embodiment, the post-printing process support system, the post-printing process support program, and the post-printing process support method according to the aspect of the invention are applied to the case in which a preview image is displayed through animation based on a job ticket and print data. This embodiment is different from the first embodiment in that animation data is generated which shows the procedure of performing one-sided printing using a network printer only capable of one-sided printing. Only components different from those of the first embodiment will be described hereafter, and components overlapping between this embodiment and the first embodiment are identified by like reference numerals and omitted from description.

Processes to be executed by the CPU 50 will first be described.

Figure 10:
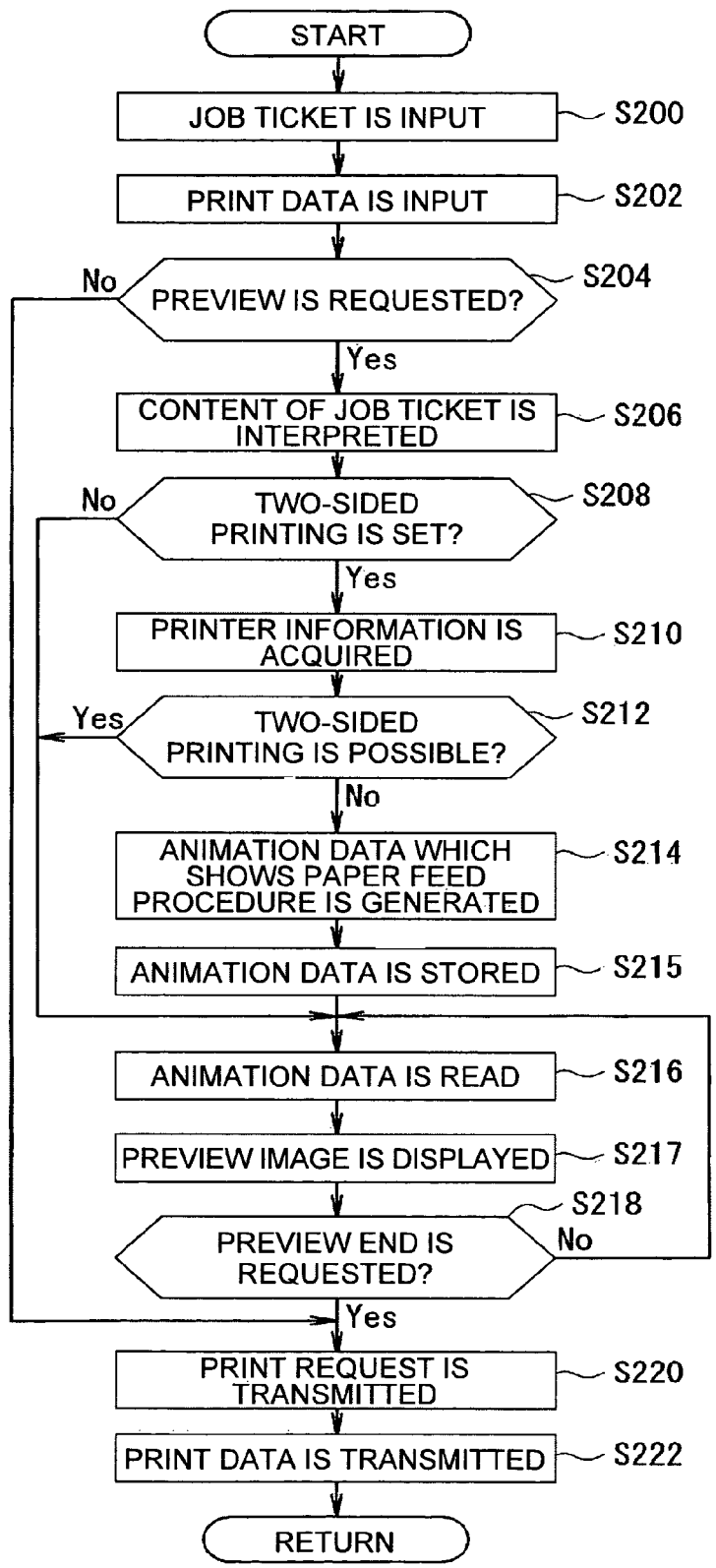
FIG. 10 is a flowchart showing a print request process.
Figure 11A:
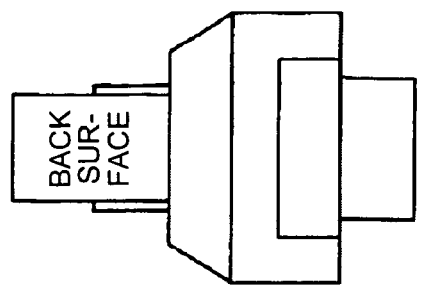
FIGS. 11A to 11D are diagrams showing the animation of a preview image.
Figure 11B:
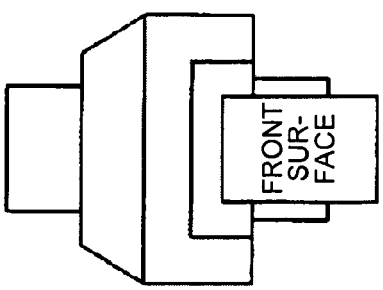
Figure 11C:
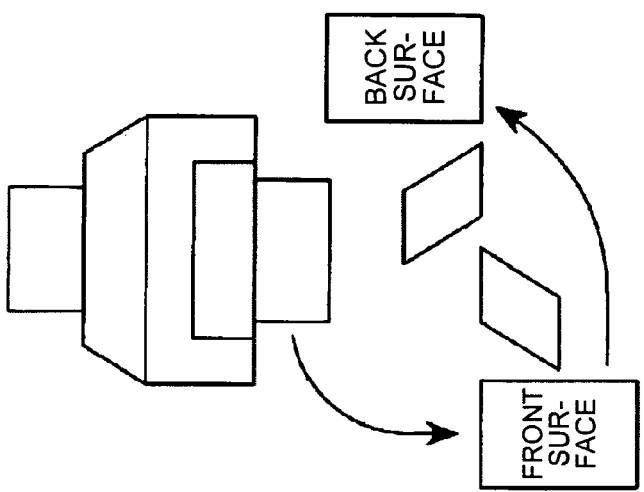
Figure 11D:
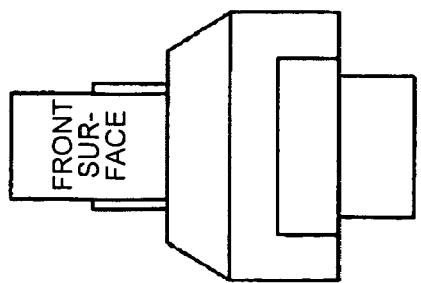

The CPU 50 activates a predetermined program, stored in a predetermined region of the ROM 52, to execute a print request process shown in the flowchart of FIG. 10 in place of the print request process in FIG. 6.

FIG. 10 is a flowchart showing the print request process.

The print request process is the process of issuing a printing request to the network printer. When the CPU 50 executes the print request process, as shown in FIG. 10, the process first moves to step S200.

In step S200, a job ticket 200 is input, and the process moves to step S202, in which print data is input. The process then moves to step S204, in which it is determined whether or not a request has been issued to display a preview image. If it is determined a request has been issued to display the preview image (Yes), the process moves to step S206.

In step S206, the content of the job ticket 200 input is interpreted, and the process moves to step S208, in which it is determined, based on the interpretation result of step S206, whether or not the job ticket 200 includes a two-sided print setting. If it is determined that a two-sided print setting is included (Yes), the process moves to step S210.

In step S210, printer information is acquired from a network printer in charge of printing, and the process moves to step S212, in which it is determined, based on the printer information acquired, whether the network printer in charge of printing is capable of two-sided printing or not. If it is determined that the network printer in charge of printing is not capable of two-sided printing (No), the process moves to step S214.

In step S214, a conceptual image 600 is generated based on the print data input, and when printing paper having had one surface printed using the conceptual image 600 generated is fed again to the network printer to print the other surface, animation data, which shows the procedure of feeding the printing paper to the network printer, is generated. The process then moves to step S215, in which the animation data generated is stored in the storage device 62.

Next, the process moves to step S216, in which the animation data generated in step S214 is read from the storage device 62. The process then moves to step S217, in which a preview image is displayed through animation on the display device 64 based on the animation data read. The process further moves to step S218, in which it is determined whether or not a request has been issued to end the display of the preview image. If a request has been issued to end the display of the preview image (Yes), the process moves to step S220.

The process moves to step S220 to transmit the print request to the network printer, and the process then moves to step S222 to transmit the job ticket 200 and the print data, which have been input, to the network printer. The series of process steps is thus brought to an end to return to the original process.

Conversely, if it is determined in step S218 that a request has not been issued to end the display of the preview image (No), the process moves to step S216.

Conversely, if it is determined in step S212 that the network printer for printing is capable of two-sided printing (Yes), and if it is determined in step S208 that the two-sided print setting is not included in the job ticket 200 (No), the process moves to step S216.

Conversely, if it is determined in step S204 that a request has not been issued to display the preview image (No), the process moves to step S220.

The operation of this embodiment will now be described.

The operation of this embodiment will be described using as an example the case in which two-sided printing is performed using a network printer capable of only one-sided printing.

A user uses the host terminal 100 to input a job ticket 200 including a two-sided print setting, and print data corresponding thereto, and requests the display of a preview image.

In the host terminal 100, when the job ticket 200 and the print data are input to request the display of the preview image, the content of the job ticket 200 is interpreted through steps S206 and S208. It is then determined, based on the interpretation result, whether or not the two-sided print setting is included in the job ticket 200. Since the two-sided print setting is included in the job ticket 200, through steps S210 and S212, a conceptual image 600 is generated based on the print data input, and print data is acquired from the network for printing, and it is determined, based on the print data acquired, whether the network printer in charge of printing is capable of two-sided printing. Since the network printer capable of only one-sided printing is designated to perform printing, through step S214, a conceptual image 600 is generated based on the print data input, and when printing paper having one surface printed using the conceptual image 600 generated is fed again to the network printer to print the other surface, animation data, which shows the procedure of feeding the printing paper to the network printer, is generated. Then, through step S217, the preview image is displayed through animation based on the animation data generated.

FIGS. 11A to 11D are diagrams showing the animation of a preview image.

In the preview image, images in FIGS. 11A to 11D are displayed in succession at regular timed intervals in the order named, thereby showing through animation the procedure of feeding printing paper to the network printer. The user can visually comprehend from the display of the images in FIGS. 11A to 11D that the printing paper is to be fed, with the front surface upward, to the network printer (FIG. 11A), printed on the front surface by the network printer, and thereafter discharged to the front of the network printer (FIG. 11B), and that the paper discharged is to be inverted around the upper edge of the paper (FIG. 11C) and fed again to the network printer.

This embodiment is thus configured such that the job ticket 200 including the two-sided print setting is input, such that, based on the job ticket 200 input, animation data, which shows the procedure of feeding printing paper printed based on this job ticket 200, is generated, and such that a preview image is displayed through animation based on the animation data generated.

Even an inexperienced user can thereby relatively reliably perform the operation of feeding printing paper to the network printer in performing manual two-sided printing.

Furthermore, this embodiment is configured such that, based on print data, a conceptual image 600 of printing paper to be printed based on a job ticket 200 and the print data is generated, and such that animation data is generated using the conceptual image 600 generated.

The procedure is thereby displayed in response to a print result, which therefore makes it easier to comprehend the procedure of feeding printing paper.

In the second embodiment, the job ticket input section 10 and step S200 correspond to the print setting information acquisition section according to Aspect 1, 5, 8, or 12, step S200 corresponds to the print setting information acquisition step according to Aspect 15, 19, 22, 26, 29, 30, or 34, and the animation data generation section 16 and steps S208 to S214 correspond to the animation data generation section according to Aspect 1, 5, 8, or 12. Besides, steps S208 to S214 correspond to the animation data generation step according to Aspect 15, 19, 22, 26, 29, 30, or 34, and the preview image display section 18 and step S217 correspond to the animation image display section according to Aspect 1 or 8.

Additionally, in the second embodiment, step S217 corresponds to the animation image display step according to Aspect 15, 22, 29 or 30, the network printer corresponds to the printing device according to Aspect 5, 12, 19, 26, or 34, and the CPU 50 corresponds to the calculation section according to Aspect 30. Besides, the display device 64 corresponds to the display section according to Aspect 30.

Figure 12:
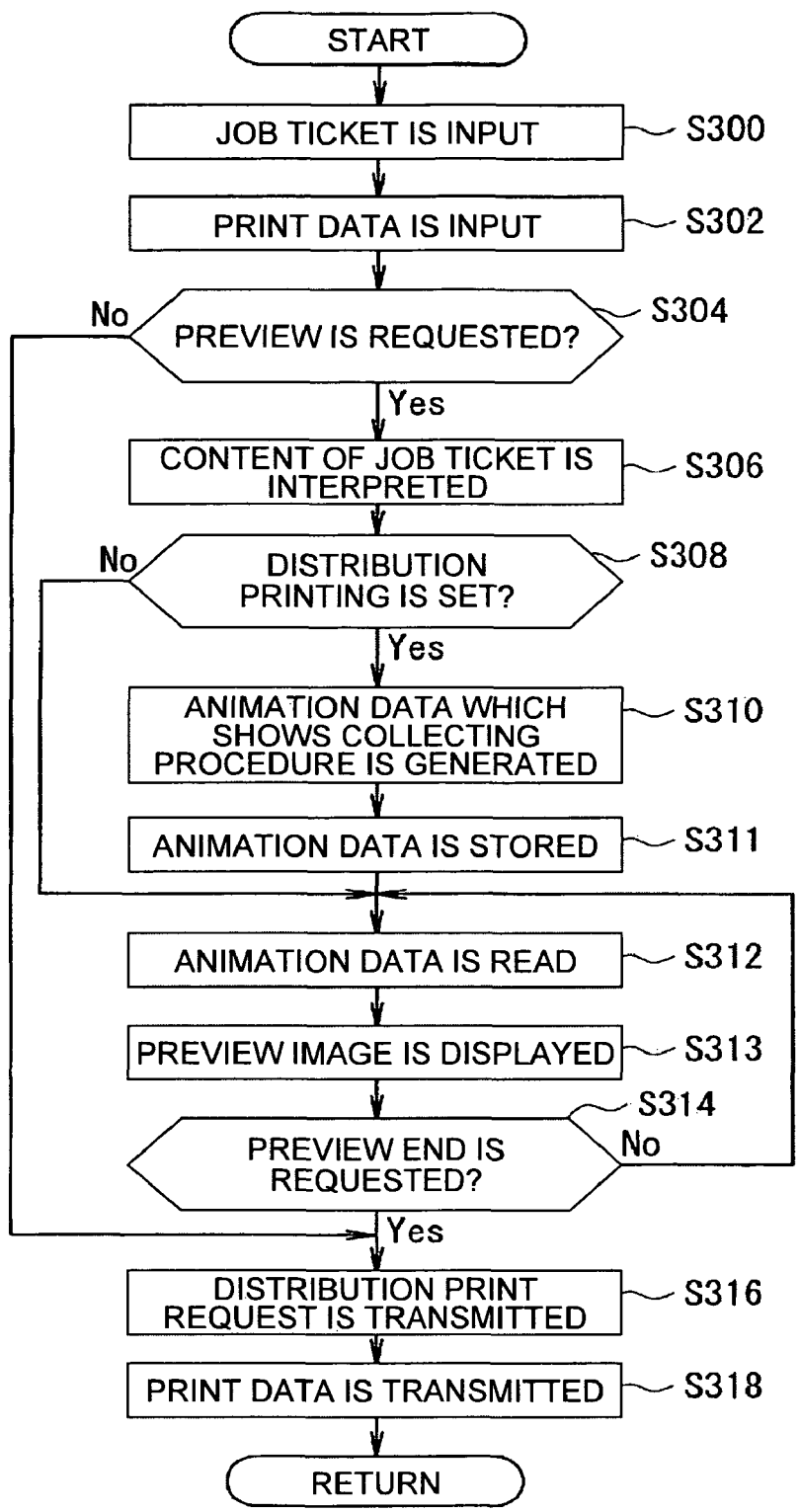
FIG. 12 is a flowchart showing a print request process.
Figure 13:
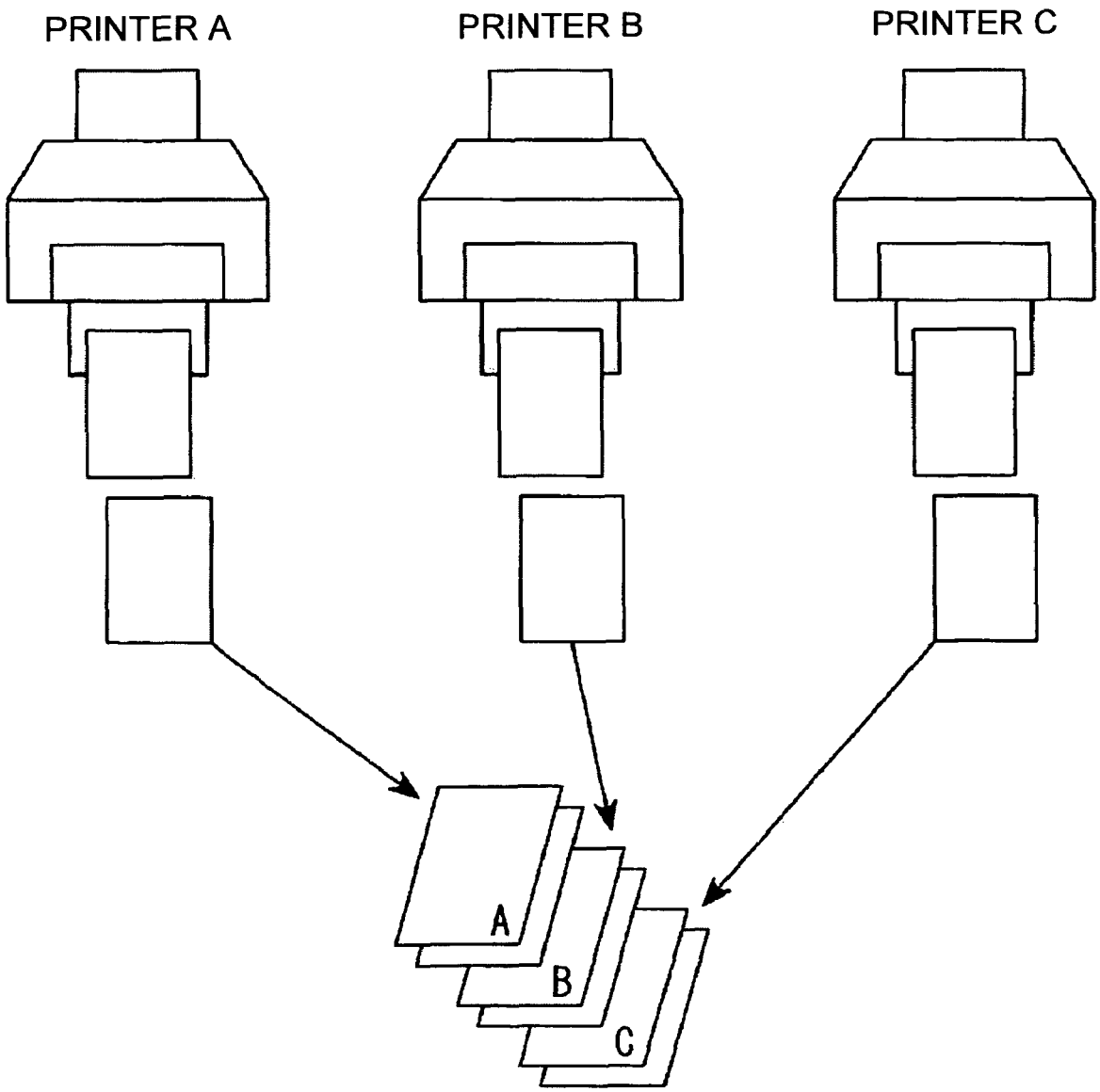
FIGS. 13A to 13C are diagrams showing the animation of a preview image.

A third embodiment of the invention will now be described with reference to the drawings. FIGS. 12 and 13 are diagrams showing the third embodiment of a post-printing process support system, a post-printing process support program, and a post-printing process support method according to an aspect of the invention.

In this embodiment, the post-printing process support system, the post-printing process support program, and the post-printing process support method according to the aspect of the invention are applied to the case in which a preview image is displayed through animation based on a job ticket and print data. This embodiment is different from the first embodiment in that animation data is generated which shows the procedure of performing distribution printing using a plurality of network printers. Only components different from those of the first embodiment will be described hereafter, and components overlapping between this embodiment and the first embodiment are identified by like reference numerals and omitted from description.

Processes to be executed by the CPU 50 will first be described.

The CPU 50 operates a predetermined program, stored in a predetermined region of the ROM 52, to execute a print request process shown in the flowchart of FIG. 12 in place of the print request process in FIG. 6.

FIG. 12 is a flowchart showing the print request process.

The print request process is the process of issuing a printing request to the network printer. When the CPU 50 executes the print request process, as shown in FIG. 12, the process first moves to step S300.

In step S300, a job ticket 200 is input, and the process moves to step S302, in which print data is input. The process then moves to step S304, in which it is determined whether or not a request has been issued to display a preview image. If it is determined that a request has been issued to display the preview image (Yes), the process moves to step S306.

In step S306, the content of the job ticket 200 input is interpreted, and the process moves to step S308, in which it is determined, based on the interpretation result of step S306, whether or not the job ticket 200 includes a distribution print setting. If it is determined that the distribution print setting is included (Yes), the process moves to step S310.

In step S310, a conceptual image 600 is generated based on the print data input, and animation data, generated using the conceptual image 600, and which shows the procedure of collecting printing paper distribution printed by the plurality of network printers, is generated based on the distribution print setting interpreted in step S306. The process then moves to step S311, in which the animation data generated is stored in the storage device 62.

Next, the process moves to step S312, in which the animation data generated in step S310 is read from the storage device 62. The process then moves to step S313, in which a preview image is displayed through animation on the display device 64 based on the animation data read. The process further moves to step S314, in which it is determined whether or not a request has been issued to end the display of the preview image. If a request has been issued to end the display of the preview image (Yes), the process moves to step S316.

The process moves to step S316 to transmit the distribution print request to the plurality of network printers, and the process then moves to step S318 to transmit the job ticket 200 and the print data, which have been input, to the plurality of network printers. The series of process steps is thus brought to an end to return to the original process.

Conversely, if it is determined in step S314 that a request has not been issued to end the display of the preview image (No), the process moves to step S312.

Conversely, if it is determined in step S308 that the distribution print setting is not included in the job ticket 200 (No), the process moves to step S312.

Conversely, if it is determined in step S304 that a request has not been issued to display the preview image (No), the process moves to step S316.

The operation of this embodiment will now be described.

The user uses the host terminal 100 to input a job ticket 200 including a distribution print setting, and print data corresponding thereto, and requests the display of a preview image.

In the host terminal 100, when the job ticket 200 and the print data are input to request the display of the preview image, the content of the job ticket 200 is interpreted through steps S306 and S308. It is then determined, based on the interpretation result, whether or not the distribution print setting is included in the job ticket 200. Since the distribution print setting is included in the job ticket 200, through step S310, a conceptual image 600 is generated based on the print data input, and animation data is generated using the conceptual image 600, which shows the procedure of collecting printing paper distribution printed by the plurality of network printers. Then, through step S313, the preview image is displayed through animation based on the animation data generated.

FIGS. 13A to 13C are diagrams showing the animation of a preview image.

In the preview image, images in FIGS. 13A to 13C are displayed in succession at regular timed intervals in the order named, thereby showing through animation the procedure of collecting printing paper from the network printers. The user can comprehend, from the display of the images in FIGS. 13A to 13C, the printing paper collecting method in which printing paper discharged from a network printer B need only be stacked on printing paper discharged from a network printer C and further have stacked thereon printing paper discharged from a network printer A.

This embodiment is thus configured such that the job ticket 200 including the distribution print setting is input, such that, based on the job ticket 200 input, animation data, which shows the procedure of collecting printing paper printed based on this job ticket 200, is generated, and such that a preview image is displayed through animation based on the animation data generated.

Even an inexperienced user can thereby relatively reliably perform the operation of collecting printing paper when performing distribution printing.

Furthermore, this embodiment is configured such that a conceptual image 600 of printing paper to be printed based on a job ticket 200 and print data is generated based on the print data, and such that animation data is generated using the conceptual image 600 generated.

The procedure is thereby displayed in response to a print result, which therefore makes it easier to comprehend the procedure of collecting printing paper.

In the third embodiment, the job ticket input section 10 and step S300 correspond to the print setting information acquisition section according to Aspect 1, 6, 8, or 13, step S300 corresponds to the print setting information acquisition step according to Aspect 15, 20, 22, 27, 29, 30, or 35, and the animation data generation section 16 and steps S308 and S310 correspond to the animation data generation section according to Aspect 1, 6, 8, or 13. Besides, steps S308 and S310 correspond to the animation data generation step according to Aspect 15, 20, 22, 27, 29, 30, or 35, and the preview image display section 18 and step S313 correspond to the animation image display section according to Aspect 1 or 8.

Additionally, in the third embodiment, step S313 corresponds to the animation image display step according to Aspect 15, 22, 29 or 30, the network printer corresponds to the printing device according to Aspect 6, 13, 20, 27, or 35, and the CPU 50 corresponds to the calculation section according to Aspect 30. Besides, the display device 64 corresponds to the display section according to Aspect 30.

Figure 14:
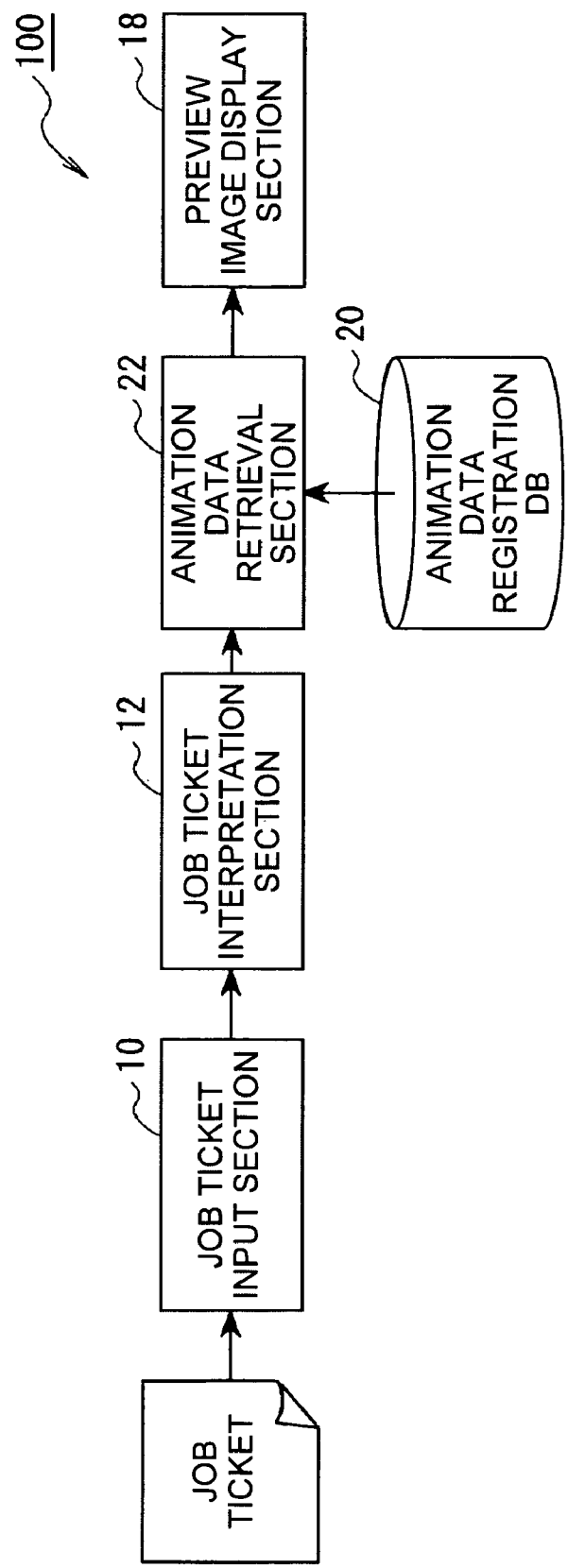
FIG. 14 is a functional block diagram showing the functional outline of a host terminal 100.
Figure 16:
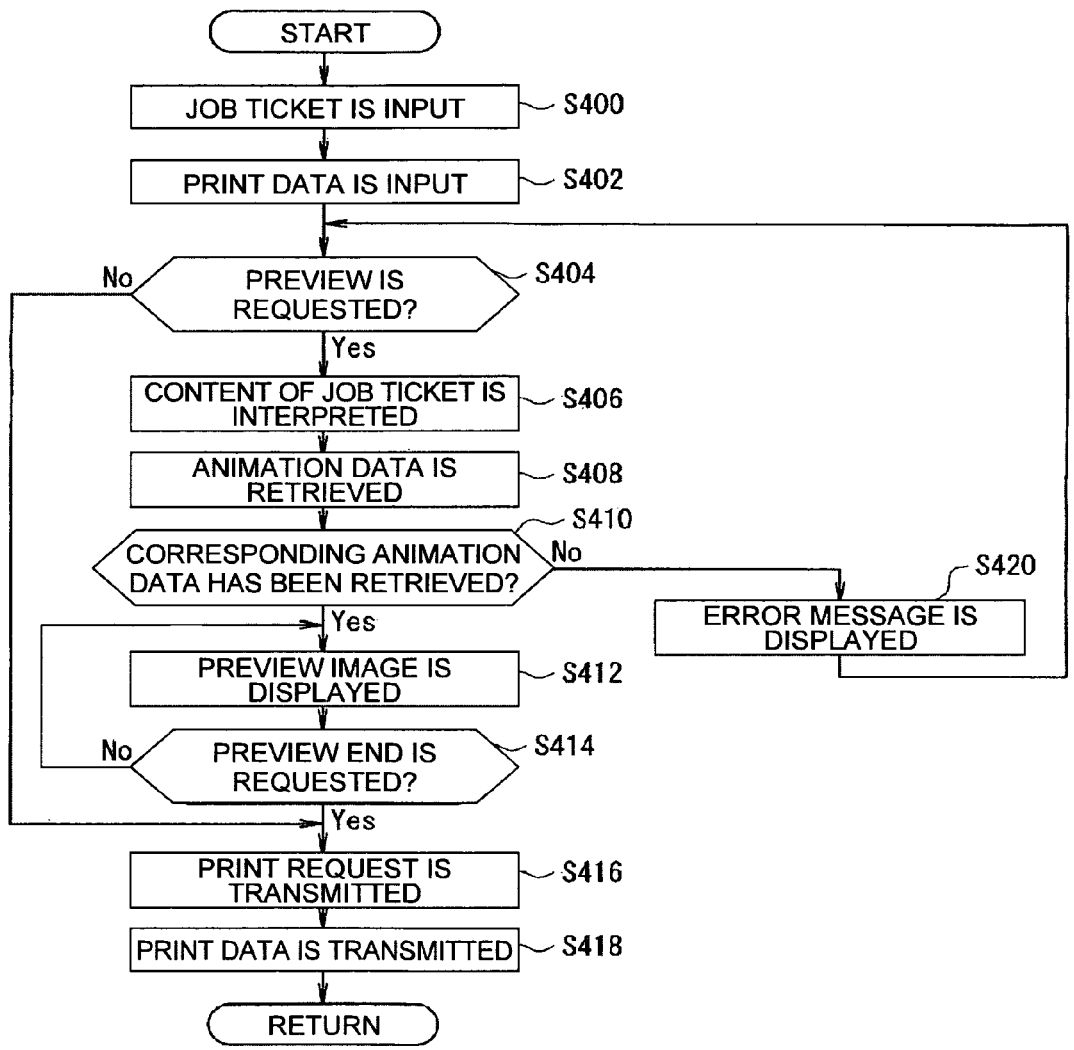
FIG. 16 is a flowchart showing a print request process.

A fourth embodiment of the invention will now be described with reference to the drawings. FIGS. 14 to 16 are diagrams showing the fourth embodiment of a post-printing process support system, a post-printing process support program, and a post-printing process support method according to an aspect of the invention.

In this embodiment, the post-printing process support system, the post-printing process support program, and the post-printing process support method according to the aspect of the invention are applied to the case in which a preview image is displayed through animation based on a job ticket and print data. This embodiment is different from the first embodiment in that plural pieces of animation data are stored, and in that animation data corresponding to the print format of a job ticket 200 is retrieved. Only components different from those of the first embodiment will be described hereafter, and components overlapping between this embodiment and the first embodiment are identified by like reference numerals and omitted from description.

The functional outline of a host terminal 100 to which the invention is applied will first be described with reference to FIG. 14.

FIG. 14 is a functional block diagram showing the functional outline of the host terminal 100.

As shown in FIG. 14, the host terminal 100 includes a job ticket input section 10, a job ticket interpretation section 12, and a preview image display section 18. In addition thereto, the host terminal 100 includes: an animation data registration database (the database will hereafter be abbreviated simply as the DB) 20 which stores animation data which shows the procedures of post-printing processes (folding, cutting, binding, feeding, and collecting) relating to printing paper, the processes being related to print format information; and an animation data retrieval section 22 which retrieves animation data, which corresponds to the print format of a job ticket 200, from the animation data registration DB 20 based on a interpretation result of the job ticket interpretation section 12.

The data structure of the animation data registration DB 20 will now be described.

The animation data registration DB 20 stores plural pieces of animation data and also stores an animation data management table 700 which manages the animation data.

FIG. 15 is a diagram showing the data structure of the animation data management table 700.

As shown in FIG. 15, records are registered in the animation data management table 700, one for each piece of animation data. The records each include a field in which are registered a two-sided print setting, a printing paper folding method, a printing paper binding method, a printing paper binding position, and an animation data file name.

In the example of FIG. 15, registered in a first-row record are "TwoSidedFlipX" as the two-sided print setting, "F8-1" as the folding method, "saddle stitching" as the binding method, "left" as the binding position, and "anime001.gif" as the file name. This shows that animation data "anime001.gif" is retrieved when "TwoSidedFlipX", "F8-1", and "saddle stitching" are set as the print format of the job ticket 200.

Processes to be executed by the CPU 50 will now be described.

The CPU 50 activates a predetermined program, stored in a predetermined region of the ROM 52, to execute a print request process shown in the flowchart of FIG. 16 in place of the print request process in FIG. 6.

FIG. 16 is a flowchart showing the print request process.

The print request process is the process of issuing a printing request to the network printer. When the CPU 50 executes the print request process, as shown in FIG. 16, the process first moves to step S400.

In step S400, a job ticket 200 is input, and the process moves to step S402, in which print data is input. The process then moves to step S404, in which it is determined whether or not a request has been issued to display a preview image. If it is determined that a request has been issued to display the preview image (Yes), the process moves to step S406.

In step S406, the content of the job ticket 200 input is interpreted. The process then moves to step S408, in which, based on the interpretation result of step S406 and the animation data management table 700, animation data corresponding to the two-sided print setting, the folding method, the binding method, and the binding position which are set as the print format in the job ticket 200. The process thereafter moves to step S410.

In step S410, it is determined whether the corresponding animation data has been retrieved or not. If it is determined that the corresponding animation data has been retrieved (Yes), the process moves to step S412.

In step S412, a preview image is displayed through animation on the display device 64 based on the animation data retrieved. The process then moves to step S414 in which it is determined whether or not a request has been issued to end the display of the preview image. If a request has been issued to end the display of the preview image (Yes), the process moves to step S416.

The process moves to step S416 to transmit a print request to the network printer, and the process then moves to step S418 to transmit the job ticket 200 and the print data, which have been input, to the network printer. The series of process steps is thus brought to an end to return to the original process.

Conversely, if it is determined in step S414 that a request has not been issued to end the display of the preview image (No), the process moves to step S412.

Conversely, if it is determined in step S410 that the corresponding animation data has not been retrieved (No), the process moves to step S420, in which an error message is displayed on the display device 64. The process then moves to step S404.

Conversely, if it is determined in step S404 that a request has not been issued to display the preview image (No), the process moves to step S416.

The operation of this embodiment will now be described.

The operation of this embodiment will be described using as an example the case in which four pages are allocated to each of both surfaces of printing paper and the printing paper is to be folded in four to perform saddle stitching.

The user uses the host terminal 100 to input a job ticket 200, which includes a two-sided print setting, a folding method, a binding method, and a binding position, and print data corresponding to this job ticket 200, and requests the display of a preview image.

In the host terminal 100, when the job ticket 200 and the print data are input to request the display of the preview image, the content of the job ticket 200 is interpreted through steps S406 and S408. Animation data, which corresponds to the two-sided print setting, the folding method, the binding method, and the binding position, is retrieved based on the interpretation result. As a result thereof, when the corresponding animation data has been retrieved, through step S412, the preview image is displayed through animation based on the animation data retrieved.

This embodiment is thus configured such that a job ticket 200, which includes a two-sided print setting, a folding method, a binding method, and a binding position, is input, such that animation data corresponding to the print format of the job ticket 200 input is retrieved from the animation data registration DB 20, and such that a preview image is displayed through animation based on the animation data retrieved.

The procedures of post-printing processes relating to printing paper are thereby displayed, which therefore makes it easier to comprehend the procedures of the processes. Even an inexperienced user can thereby relatively reliably perform the processes which should be performed after printing.

In the fourth embodiment, the animation data registration DB 20 corresponds to the animation data storage section according to Aspect 7, 14, 21, 28, 36, or 37, the printing paper corresponds to the printing medium according to Aspect 7, 14, 21, 28, 36, or 37, and the job ticket 200 corresponds to the print setting information according to Aspect 7, 14, 21, 28, 36, or 37. Besides, the job ticket input section 10 and step S400 correspond to the print setting information acquisition section according to Aspect 7 or 14, step S400 corresponds to the print setting information acquisition step according to Aspect 21, 28, 36, or 37, and the animation data retrieval section 22 and step S408 correspond to the animation data retrieval section according to Aspect 7 or 14.

Additionally, in the fourth embodiment, step S408 corresponds to the animation data retrieval step according to Aspect 21, 28, 36 or 37, the preview image display section 18 and step S412 correspond to the animation image display section according to Aspect 7 or 14, and step S412 corresponds to the animation image display step according to Aspect 21, 28, 36, or 37. Besides, the CPU 50 corresponds to the calculation section according to Aspect 37, and the display device 64 corresponds to the display section according to Aspect 37.

The first to fourth embodiments have not specifically described the accuracy of animation. However, the invention may be configured such that the user is led to select one of the following preview display modes: a detailed preview mode in which the image 500 of a print content is distorted in response to the amount of distortion of the printing paper image 400 in order to place an importance on realism; and a simplified preview display mode in which the print content image 500 is not distorted in order to reduce the information processing burden, and such that the accuracy of animation is varied according to the preview display mode selected.

The first to fourth embodiments are configured such that a preview image is displayed immediately after animation data is generated. However, the invention is not limited to this configuration, and may be configured such that the animation data is stored in a storage device such as a memory or an HDD and later read as appropriate to display a preview image. In this case, when the invention is further configured such that a two-dimensional bar code having described therein the location (e.g., URI) of print data and animation data is also printed simultaneously during printing, then by only causing a bar code reader to read the two-dimensional bar code, it is possible to acquire animation data related thereto and thus display the preview image.

The first to fourth embodiments are configured such that animation data, which shows the procedures of folding, cutting, binding, feeding, and collecting printing paper, is generated. However, the invention is not limited to this configuration, and may be configured such that, when it is determined, in response to the content of a job ticket 200, that ink attached to the network printer need be replaced, animation data, which shows the procedure of replacing the ink, is generated. Besides, the invention may also be configured such that, when it is determined, in response to the content of a job ticket 200, that a manual setting need be performed on the network printer, animation data, which shows the procedure of performing the manual setting on the network printer, is generated.

The first to fourth embodiments are configured such that printing is performed after a preview image is displayed. However, the invention is not limited to this configuration, and may be configured such that the printing is not performed and only a preview image is displayed.

The first to fourth embodiments have described the case in which the control program pre-stored in the ROM 52 is executed in all the cases of executing the processes shown in the flowcharts of FIGS. 6, 10, 12, and 16. However, the invention is not limited to this case, and may be configured such that, as shown in FIG. 17, the RAM 54 is caused to read a program indicating these procedures from a storage medium having the program stored therein, thus executing the procedures.

Figure 17:
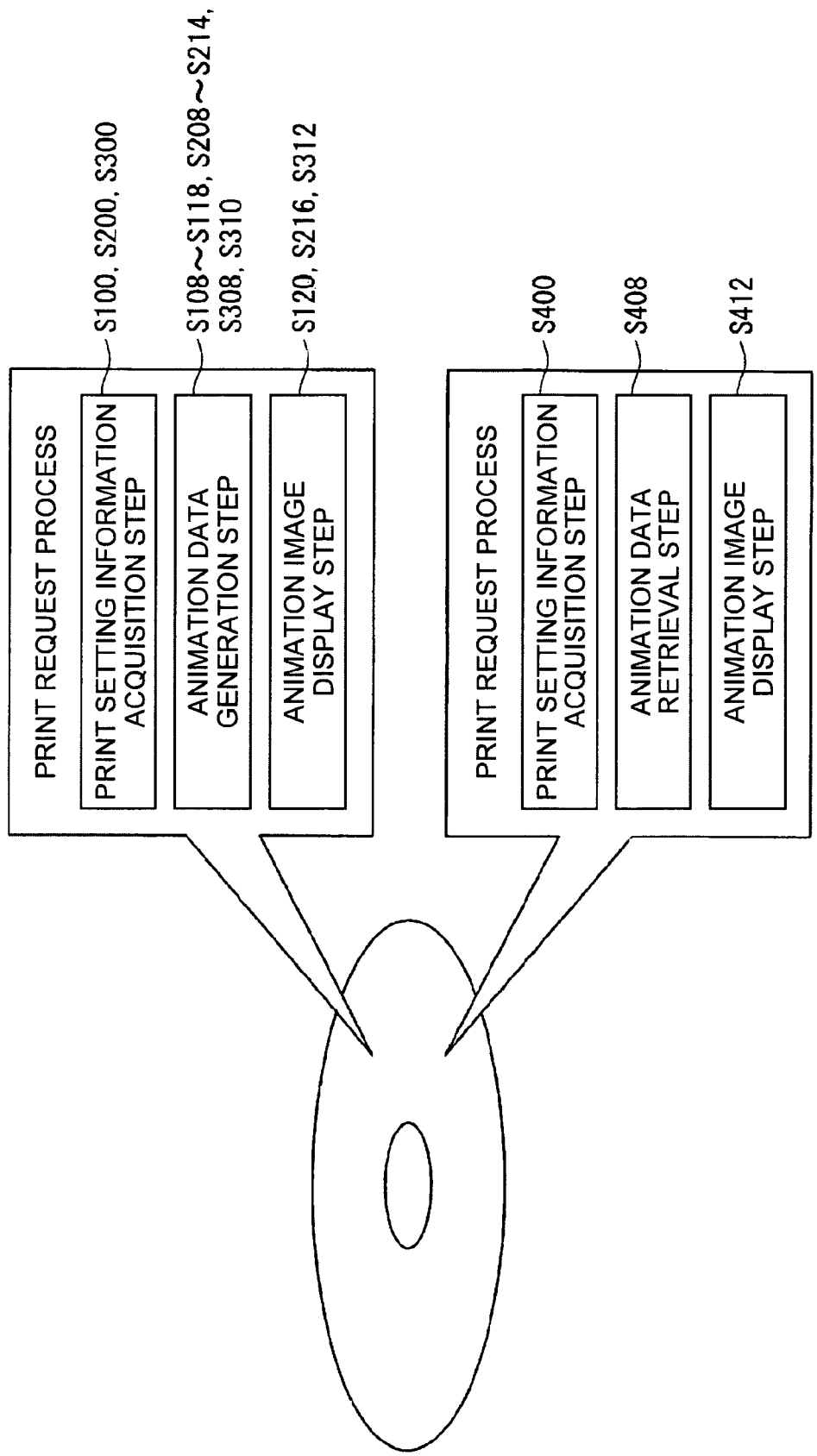
FIG. 17 is a diagram showing a storage medium and its data structure.

FIG. 17 is a diagram showing a storage medium and its data structure.

As used herein, the storage medium refers to a semiconductor storage medium such as a RAM and a ROM, a magnetic-storage type storage medium such as an FD and an HD, an optical reading system storage medium such as a CD, a CDV, an LD, and a DVD, or a magnetic-storage type/optical reading system storage medium such as an MO. The storage medium includes any storage medium which is readable on a computer, regardless of whether it requires an electronic, magnetic, optical, or other reading method.

In the first to fourth embodiments, a post-printing process support system, a post-printing process support program, and a post-printing process support method according to an aspect of the invention are applied to the case in which a preview image is displayed through animation based on a job ticket and print data. However, the invention is not limited thereto, but can be applied to any other case without departing from the spirit and scope of the invention.

What is claimed is:

1. A post-printing process support system, which supports a post-printing process relating to a print medium, comprising:
   a print setting information acquisition section which acquires print setting information including a setting relating to a print format;
   an animation data generation section which generates, based on the print setting information acquired by the print setting information acquisition section, animation data which shows a post-printing process procedure relating to the print medium having been printed based on the print setting information, the animation data having a plurality of static images showing the post-printing process procedure; and
   an animation image display section which displays an animation image based on the animation data generated by the animation data generation section by displaying the plurality of static images in succession;
   wherein the animation image includes a conceptual image having a printing paper image and a content image;
   the post-printing process support system being equipped with a mode selector for selecting either a first mode or a second mode, the first mode for displaying the conceptual image with the printing paper image having a distortion of angle and the content image having a distortion of angle corresponding to the distortion of angle of the printing paper image, the second mode for displaying the conceptual image with the printing paper image having a distortion of angle and the content image without having a distortion of angle; and
   the animation image display section, when the post-printing process support system is in the first mode, changing the content image having the distortion of angle to the content image in a schematic figure without the distortion of angle.

2. A post-printing process support system according to claim 1, wherein
   the print setting information includes a setting relating to a method of folding the print medium, and wherein
   the animation data generation section generates, based on the print setting information acquired by the print setting information acquisition section, animation data which shows a procedure for folding the print medium having been printed based on the print setting information.

3. A post-printing process support system according to claim 1, wherein
   the print setting information includes a setting relating to a method of cutting the print medium, and wherein
   the animation data generation section generates, based on the print setting information acquired by the print setting information acquisition section, animation data which shows a procedure for cutting the print medium having been printed based on the print setting information.

4. A post-printing process support system according to claim 1, wherein
   the print setting information includes a setting relating to a method of binding the print medium, and wherein
   the animation data generation section generates, based on the print setting information acquired by the print setting information acquisition section, animation data which shows a procedure for binding the print medium having been printed based on the print setting information.

5. A post-printing process support system according to claim 1, wherein
   the print setting information includes a setting relating to two-sided printing, and wherein
   the animation data generation section generates, based on the print setting information acquired by the print setting information acquisition section, animation data which shows a procedure for feeding the print medium to a printing device when the print medium having had one side printed is fed again to the printing device to print the other side based on the print setting information.

6. A post-printing process support system according to claim 1, wherein
   the print setting information includes a setting relating to distribution printing, and wherein
   the animation data generation section generates, based on the print setting information acquired by the print setting information acquisition section, animation data which shows a procedure for collecting the print medium, having been distribution printed using a plurality of printing devices, based on the print setting information.

* * * * *